US010198963B2

(12) United States Patent
Michalowitz et al.

(10) Patent No.: US 10,198,963 B2
(45) Date of Patent: Feb. 5, 2019

(54) SECURE COMPUTERIZED SYSTEM, METHOD AND COMPUTER PROGRAM PRODUCT FOR CHILDREN AND/OR PRE-LITERATE/ILLITERATE USERS

(71) Applicant: GOOGALE (2009) LTD., Cesaria (IL)

(72) Inventors: Nir Michalowitz, Cesaria (IL); Michal Peled Rosenvald, Tel-Aviv (IL)

(73) Assignee: GOOGALE (2009) LTD., Cesaria (IL)

( * ) Notice: Subject to any disclaimer, the term of this patent is extended or adjusted under 35 U.S.C. 154(b) by 0 days.

(21) Appl. No.: 15/837,656

(22) Filed: Dec. 11, 2017

(65) Prior Publication Data
US 2018/0114461 A1    Apr. 26, 2018

Related U.S. Application Data

(63) Continuation-in-part of application No. 15/317,392, filed as application No. PCT/IL2016/050631 on Jun.
(Continued)

(51) Int. Cl.
*H04L 12/58* (2006.01)
*G09B 19/00* (2006.01)
(Continued)

(52) U.S. Cl.
CPC ......... *G09B 19/0053* (2013.01); *G06F 3/041* (2013.01); *G06F 3/0488* (2013.01);
(Continued)

(58) Field of Classification Search
CPC ....... H04L 51/32; H04L 63/083; H04L 63/10; H04L 63/101; G06Q 50/01
See application file for complete search history.

(56) References Cited

U.S. PATENT DOCUMENTS 5,559,961 A * 9/1996 Blonder .................. G06F 21/36
726/18
8,392,975 B1   3/2013 Raghunath
(Continued)

FOREIGN PATENT DOCUMENTS

WO    2004/111870 A1    12/2004
WO    2014/144908 A1    9/2014

OTHER PUBLICATIONS

Al-Khateeb et al. "Enhancing usability and security in click-based visual password systems." IADIS International Conference e-Society, 2010.
(Continued)

*Primary Examiner* — Saleh Najjar
*Assistant Examiner* — Devin E Almeida
(74) *Attorney, Agent, or Firm* — Oliff PLC

(57) ABSTRACT

A secured computerized social networking system for pupils including a mail server operative to interface with a secured parent environment; and a secured pupil environment, the system comprising a computerized environment secured to prevent access thereto, other than by end-users who have passed a what-you-know authentication test; a what-you-know testing functionality; and a graphic what-you-know test-configuring functionality, the system being operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising: a processor-controlled touch-triggered actor; and a processor-controlled touch-triggered oral presenter.

16 Claims, 11 Drawing Sheets

Related U.S. Application Data 16, 2016, now Pat. No. 9,871,798, application No. 15/837,656, which is a continuation-in-part of application No. PCT/IL2016/050632, filed on Jun. 16, 2016, application No. 15/837,656, which is a continuation-in-part of application No. PCT/IL2016/050630, filed on Jun. 16, 2016.

(60) Provisional application No. 62/181,318, filed on Jun. 18, 2015, provisional application No. 62/181,313, filed on Jun. 18, 2015, provisional application No. 62/181,328, filed on Jun. 18, 2015.

(51) Int. Cl.
*G06F 3/041* (2006.01)
*H04L 29/06* (2006.01)
*G09B 5/06* (2006.01)
*G06Q 10/10* (2012.01)
*G06Q 50/00* (2012.01)
*G06F 3/0488* (2013.01)

(52) U.S. Cl.
CPC ........... *G06Q 10/107* (2013.01); *G06Q 50/01* (2013.01); *G09B 5/062* (2013.01); *G09B 5/065* (2013.01); *H04L 51/12* (2013.01); *H04L 51/32* (2013.01); *H04L 63/083* (2013.01); *H04L 63/101* (2013.01)

(56) References Cited

U.S. PATENT DOCUMENTS

| | | | |
|---|---|---|---|
| 8,554,835 | B1 | 10/2013 | Williams |
| 8,601,589 | B2 | 12/2013 | Blagsvedt et al. |
| 8,881,251 | B1 | 11/2014 | Hilger |
| 2003/0234824 | A1* | 12/2003 | Litwiller ............... G09B 21/006 715/865 |
| 2006/0085845 | A1 | 4/2006 | Davis et al. |
| 2006/0174339 | A1 | 8/2006 | Tao |
| 2006/0267276 | A1 | 11/2006 | Farmer et al. |
| 2006/0287030 | A1 | 12/2006 | Briggs et al. |
| 2007/0277224 | A1 | 11/2007 | Osborn et al. |
| 2009/0217342 | A1* | 8/2009 | Nadler ..................... G06F 21/40 726/1 |
| 2009/0254829 | A1 | 10/2009 | Rohde |
| 2010/0218663 | A1* | 9/2010 | Choi ..................... G06F 3/0482 84/609 |
| 2012/0167199 | A1 | 6/2012 | Riddiford |
| 2013/0047252 | A1 | 2/2013 | Johnson et al. |
| 2013/0268775 | A1 | 10/2013 | Hawkins |
| 2014/0025760 | A1 | 1/2014 | Shore et al. |
| 2015/0178490 | A1 | 6/2015 | Tamboly et al. |

OTHER PUBLICATIONS

Mhlanga. "Graphical Password Authentication for Secure Social Networks," 2013.
Radhika et al. "Compare Usability and Security of Graphical User Authentication Approaches." International Journal of Computer Science and Mobile Computing, Sep. 2014.
http://www.darkreading.com/vulnerabilities-and-threats/windows-8-picture-passwords-easily-cracked/d/d-id/1111351?; Sep. 28, 2013.
"PowerSchool Parent Portal User Guide;" Pearson; PowerSchol 7 .x Student Information System; May 2012; 26 pp.
U.S. Appl. No. 15/735,413, filed Dec. 11, 2017 in the name of Michalowitz.
U.S. Appl. No. 15/735,399, filed Dec. 11, 2017 in the name of Michalowitz et al.

* cited by examiner

FIG. 2

Step 1: The student Clicks on his name

↓

Step 2: The system's testing functionality shows a picture associated with e.g. randomly selected for the student and prompts the student to input his password (e.g. click at the right places in the right order)

↓

Step 3: Student requests assistance and the teacher approaches his work-station

↓

Step 4: Teacher uses child's work-station to select an Option either for all end-users in her class or for an individual. E.g. Approve student's identity and enable her to immediately start tasks. OR see/ Modify the student's Password (go to step 5) OR activate system's e-learning functionality (go to step 6)

↓

Step 5: interact with the test configuring functionality to Modify Password, e.g. by modifying, say by dragging, a display of an existing pictorial password including marked locations on an image

↓

Step 6: Password training game guided by the system's e-learning functionality that typically speaks/ guides and encourages the student to learn (remember and accurately enter) her/his password

Fig. 4

In a first stage, the system is commanded by a processor to overlay on an image/picture n, e.g. as shown in Fig. 3, n (e.g. 3) numbered or otherwise ordered regions e.g. circles (e.g. with half transparent background) indicating the location and order of the password

↓

In a second stage the system is commanded by a processor to display n, e.g. 3 empty circles (e.g. with border and/or transparent background – no numbers) on the screen, typically overlaid over the image

↓

In a third stage the system is commanded by a processor to show just picture (image) with no overlay (hence system does not show circles on screen )

Fig. 5a

5210: providing a touch screen defining a plurality of touch screen locations respectively corresponding to a plurality of selectable system-actions and operative to detect and distinguish between first and second gestures

↓

5220: providing an oral presentation library including a plurality of recorded oral presentations which when played to the end user by the oral presenter, orally characterize the plurality of actions respectively

↓

5230: providing a rules database storing at least one rule governing the behavior of at least one of the oral presenter and the actor, responsive to at least one sequence of end-user gestures including initial and subsequent end-user gestures; the rules database may store at least one premature-gesture-handling rule (e.g. for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B)

↓

To step 5240 of Fig. 5b

Fig. 5b

From step 5230 of Fig. 5a

5240: providing a touch-triggered actor which, responsive to at least each first gesture applied by an end-user to an individual location within the touch screen, from among a plurality of touch screen locations, performs at least one individual action, from among the plurality of actions, which corresponds to the individual location

5250: providing a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location

5260: using touch screen and/or library and/or database and/or actor and/or oral presenter to interact with a pre-literate, non-literate or semi-literate end-user including providing oral information in a manner which well serves, and does not frustrate, the goals of the end-user e.g. child

Fig. 6 step 6310: if an initial gesture is sensed at button A (e.g. of Fig. 4), oral presenter begins orally characterizing button A (5 sec sound file/ text/ image/ all may be data driven externally)

step 6320: if a subsequent gesture is sensed by button B while the oral characterization of button A is still playing, oral presenter aborts oral characterization of button A and begins orally characterizing button B

step 6330: if the initial gesture was a brief tap, begin performing the action corresponding to button A if the oral characterization of the button A terminates without interruption. If gesture was tap-hold, do not perform the action corresponding to button A

step 6340: return to wait mode, go to step 6310 when next gesture is sensed.

Fig. 10 a. the Email addresses of Neal (Ehud's dad) and Sara have been entered to the system and associated with the respective children

↓ b. Sara invites Neal (father of Ehud). Sara identifies Neal by the combination of Ehud's name and Neal's email. The system tries to identify the child by his first name & his father's email address

↓ c. If the child was not found, the system lets Sara know that Ehud, son of Neal, is not registered to the system and gives Sara   options:
       1. An opportunity to modify the request and/or
       2. An opportunity to invite Neal to join

↓ d.    If option #2 was selected by Sara, the system sends a proposition mail to the email of Neal (father of Ehud), including e.g. the name of Ehud and a link to the registration site typically including a GUID associated with this specific request.

↓ e.    If the system succeeded in identifying the child (Ehud) the system sends mail to Neal (father of Ehud) with an invitation.

↓ d.    Neal Accepts the invitation;  Neal registers Ehud and creates a new student.

↓ e. Neal enters the parental part of the new student's address book and selects the relevant invitation to this child.

↓ f. A prefix (at least) of the child name is compared to the name on the invitation.  If these match, the invitation may be updated and may contain the identity of new student in the system.

↓ g. The parent approves the invitation. Entries are created in an address book that connects the two children

↓ h. The inviting parent receives a mail that his invitation has been approved.

SECURE COMPUTERIZED SYSTEM, METHOD AND COMPUTER PROGRAM PRODUCT FOR CHILDREN AND/OR PRE-LITERATE/ILLITERATE USERS

REFERENCE TO CO-PENDING APPLICATIONS

This is a Continuation-in-Part of application Ser. No. 15/317,392 filed Dec. 8, 2016, which is a National Phase of Application No. PCT/IL2016/050631 filed Jun. 16, 2016, which claims the benefit of U.S. Provisional Application No. 62/181,318 filed Jun. 18, 2015. This is also a Continuation-in-Part of Application No. PCT/IL2016/050632 filed Jun. 16, 2016, which claims the benefit of U.S. Provisional Application No. 62/181,313 filed Jun. 18, 2015. This is also a Continuation-in-Part of Application No. PCT/IL2016/050630 filed Jun. 16, 2016, which claims the benefit of U.S. Provisional Application No. 62/181,328 filed Jun. 18, 2015. The disclosures of all of the above listed prior applications are hereby incorporated by reference herein in their entireties.

FIELD OF THIS DISCLOSURE

The present invention relates generally to child-operated systems and more particularly to child-operated computerized systems.

BACKGROUND FOR THIS DISCLOSURE

Conventional technology constituting background to certain embodiments of the present invention includes the following:

Microsoft Windows 8 offers gesture-based passwords, set up e.g. by "choosing a photo from one's Picture Library folder and drawing three points on the image. The system accepts taps, lines and circles. Windows 8 subdivides the image into a 100×100 grid and stores the input points as grid coordinates". This feature was apparently proposed because "tracing a pattern on a familiar photograph is fun". However, researchers have complained that Microsoft's picture gesture authentication (PGA) is not secure, e.g. because users don't select points on their images randomly; instead they strongly tend to pick points such as eyes or certain objects. The resulting passwords enjoy less variability than randomly generated passwords hence are easier to crack. It has been suggested that the PGA be improved by providing "a picture-password-strength meter, similar to systems that prevent people from choosing weak text-based passwords".

The disclosures of all publications and patent documents mentioned in the specification, and of the publications and patent documents cited therein directly or indirectly, are hereby incorporated by reference. Materiality of such publications and patent documents to patentability is not conceded.

The Googale.co.il website describes an enterprise providing computerized tools to licensed users, typically young children who may be pre-literate; the tools may be integrated with the children's studies in kindergarten and school and with the child's activities at home. The enterprise provides email, search engine, word processor and electronic spreadsheet capabilities to young children.

Conventional mouse-operated systems display a characterization of a screen location if an end-user hovers over that location. For example, in Office, hovering over the Office button results in presentation of a text also known as a tooltip which verbally explains to the user that s/he can use this button to "see everything you can do . . . with your document". However, hovering is not a relevant concept in conventional touch-operated systems.

Conventionally, an event in which a user touches a touch-screen is classified, depending on the duration of contact (below or above certain threshold/s) between the user and the screen, as either a "tap" or a "tap-hold" (or "tap and hold") respectively.

However, since both classes of such events might also be termed "taps", the current specification classifies an event in which a user touches a touch-screen as a "brief tap" if the duration of contact between the user and the screen is short, and as a "tap-hold", if the duration of contact between the user and the screen is long.

The Googale.co.il website describes an enterprise, Googale, providing a protected computerized social network facilitating secured electronic communication between and with children including providing computerized tools to licensed users, typically young children who may be pre-literate; the tools may be integrated with the children's studies in kindergarten and school and with the child's activities at home. The Googale enterprise provides email, search engine, word processor and electronic spreadsheet capabilities to young children.

The disclosures of all publications and patent documents mentioned in the specification, and of the publications and patent documents cited therein directly or indirectly, are hereby incorporated by reference. Materiality of such publications and patent documents to patentability is not conceded.

SUMMARY OF CERTAIN EMBODIMENTS

Certain embodiments of the present invention seek to provide a system allowing pre-literate children to use pictorial passwords including changing their own passwords.

Certain embodiments of the present invention seek to provide a system training pre-literate children to remember and present their password, typically including audio feedback and gamification.

Certain embodiments of the present invention seek to provide a system in which security is provided for a restricted environment wholly or inter alia by allowing access of an end-user to the restricted environment if (and perhaps only if) a trusted user authenticates herself on the end-user's work-station as part of the end-user's work session and then authorizes access of the end-user to the restricted environment.

Certain embodiments of the present invention seek to provide a system which teaches life skills/rules/code of conduct of interaction with computerized networks, in a systematic, secure and fun manner. The system typically keeps statistics of login attempts and/or logs of training sessions so teachers can track students who need attention e.g. who violate code of conduct e.g. when a student spams, or tries to take the identity of, a different student. The system typically provides alerts to child end-users of such violations.

Certain embodiments of the present invention seek to provide a picture-password based system for access control, cocooned within additional layers of security, such that the relatively low level of security that may be provided by certain pictorial passport schemes is not problematic.

Certain embodiments of the present invention seek to provide to provide a computerized system for children in which conventional use of (a) username and (b) password for access control is replaced by, respectively:

(a) selection (from among a group of icons e.g. corresponding to kids in the child's class) of a pictorial icon pre-defined for each child by a trusted user e.g. teacher defined as trusted typically for a specific group of children; and (b) entry of a typically picture-based password memorable to and produceable by a pre-literate or semi-literate child such as selecting a sequence of locations within a particular picture, or selecting one or more pictures, e.g. in sequence, from among many.

Certain embodiments of the present invention seek to provide a system having various combinations of the above characteristics.

The present invention typically includes at least the following embodiments:

Embodiment 1

A secured computerized system comprising:

a computerized environment secured to prevent access thereto, other than by end-users who have passed a what-you-know authentication test;

a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and a graphic what-you-know test-configuring functionality operative for:

displaying at least one system-selected location within the image;

providing a graphic interface operative for accepting, from at least one end-user, a user-selected modification of the at least one system-selected location; and storing in a computer-implemented memory, for each individual end-user, the user-selected modification as the individual end-user's at least one predetermined location; or if no user-selected modification exists for an individual end-user, storing the system-selected location as the individual end-user's predetermined location.

A particular advantage of embodiments which include some or all of the above elements, is that the system typically assigns suitable locations within a given image to each user. When the choice of locations is left to the user, the user (as is the case in prior art PGA systems) tends to select certain easy-to-guess locations yielding a low level of security. In contrast, the system may for example assign a possibly randomly selected location from among a large universe of locations not limited to a small set of obvious choices such as the eyes of human figures in a scene. Alternatively the system may non-randomly assign locations to users but may do so such that a wide variety of locations are assigned. For example, the system or a teacher-user thereof may assign easy or difficult locations to different users depending on stored system knowledge regarding the level of skill of each user. For example, age may be used as a rough indicator of skill since younger children are generally less skillful than those who are older in remembering and selecting locations in an image.

Embodiment 2

A system according to any of the preceding embodiments wherein the at least one location comprises a point location and an end-user is deemed by the what-you-know testing functionality to have correctly selected a predetermined location if s/he has selected a location on the image as presented, whose distance from the point location is no more than a predetermined maximum, thereby to maintain a predetermined precision level.

Embodiment 3

A system according to any of the preceding embodiments wherein the test-configuring interface is operative for randomly selecting an image to be displayed, from among a multiplicity of images.

Embodiment 4

A system according to any of the preceding embodiments and also comprising a library of images storing a multiplicity of images, from which an image is selected for presentation.

Embodiment 5

A system according to any of the preceding embodiments wherein at least one system-selected location within an individual image comprises a location within the individual image which is pre-stored in conjunction with the individual image.

Embodiment 6

A system according to any of the preceding embodiments wherein at least one system-selected location within an individual image comprises a location of a feature within the individual image which is detected using a feature-detection algorithm.

Embodiment 7

A system according to any of the preceding embodiments wherein the feature comprises a predetermined location along an edge.

Embodiment 8

A system according to any of the preceding embodiments wherein the feature comprises a corner.

Embodiment 9

A system according to any of the preceding embodiments wherein at least one location is pre-stored in association with a characterization of the location as being suited to certain end-users and wherein the system-selected location is selected based at least partly on the characterization.

For example, different locations in an image may be characterized, e.g. by a graphic artist supplying the image, as more or less difficult for a child to find. Then, for young children, locations within the image may be selected randomly from only those locations in the image which are less difficult. For older children, locations within the image may be selected randomly from all locations in the image or only those locations in the image which are more difficult.

Edge detection algorithms include, for example, Canny edge detection, Edge thinning, Differential edge detection and Phase congruency-based edge detection. Corner detection algorithms include, for example, the Moravec corner detection algorithm, the Harris & Stephens/Plessey/Shi- Tomasi corner detection algorithm, the Förstner corner detector, the multi-scale Harris operator, the Wang and Brady corner detection algorithm, the SUSAN corner detector, and the Trajkovic and Hedley corner detector.

Embodiment 10

A system according to any of the preceding embodiments wherein the presenting at least one image comprises presenting an image selected from among a multiplicity of images pre-selected to include (a) areas of distinct color easily distinguishable by users as opposed to smoothly varying color; and/or (b) features which are both (b-1) numerous enough to provide a predetermined level of security; and/or (b-2) far enough apart to facilitate selection by an end-user capable of a predetermined level of precision.

One way of ensuring this is to provide a library of images designed by graphic artists given all or any subset of criteria a, b-1 and b-2; for example, the graphic artist may be informed that a child can select features at a level of accuracy of 0.5 cm and that presence of 50 features is sufficient to provide the desirable level of security. The graphic artist may rate some locations as easy (such as the eye in a side-view of an animal in which only 1 eye is visible), others as intermediate (such as the right eye in a front-view of an animal in which both eyes are visible) and still others as difficult (such as the tip of an optopus's $6^{th}$ leg from the right) or very difficult (such as the $10^{th}$ tile in the $3^{rd}$ row of a roof including 12 rows each having 15 tiles).

Embodiment 11

A system according to any of the preceding embodiments wherein the user-selected modification is entered by dragging from a current location and clicking to indicate a desired new location.

Embodiment 12

A system according to any of the preceding embodiments and wherein a global trusted authority defines a plurality of "local authority" end-users and a corresponding plurality of groups of end-users, wherein each "local authority" end-user is known by the trusted authority to be personally acquainted with all end-users in the corresponding group from among the plurality of groups.

For example, if each group of end-users is a group of children in a single classroom, the "local authority" end-user may be the class's teacher, who may be authorized by a trusted authority such as a computerized system under the control of the Board of Education or Ministry of Education or local municipality.

Embodiment 13

A system according to any of the preceding embodiments wherein the system also comprises an access control override functionality operative to allow any individual "local authority" end-user, from among the plurality of "local authority" end-users, to manually authorize access to the computerized environment, but only for end-users within an individual group, from among the plurality of groups of end-users, which corresponds to the individual "local authority" end-user, thereby to provide manual over-riding of the testing user interface by local authorities.

Embodiment 14

A system according to any of the preceding embodiments wherein the at least one predetermined location comprises a plurality of predetermined locations.

Embodiment 15

A system according to any of the preceding embodiments wherein the plurality of predetermined locations comprises a sequence of predetermined locations and the approving comprises approving the end-user to enter the computerized environment if the end-user enters the plurality of predetermined locations in a correct order which corresponds to the sequence.

Embodiment 16

A system according to any of the preceding embodiments wherein at least one of the user interfaces includes a call-local-authority option and wherein the override functionality is activated only after the call-local-authority option is selected.

For example, in some embodiments, a call-local authority button may be provided which, if clicked, cause a modal pop-up to appear requesting a teacher or other local authority to identify him/herself by entering a PIN, unique to each local authority, which is distributed to each local authority by the global trusted authority. Once the PIN has been entered successfully, a teacher options panel may be displayed, allowing the teacher to select at least one option from among: utilizing his or her override functionality for one particular child, changing at least one of the system-selected locations for that one particular child; or allowing that one particular child to drill his predetermined locations until the child fully remembers them. According to certain embodiments, the above process is repeated separately for each child using the system who requires teacher assistance and a teacher who 5 enters his PIN can then only select one or more of the above functions, for one particular child in his group; selecting function/s for another, second, child in his group requires the teacher, according to certain embodiments, to re-enter his PIN on the second child's work station.

Embodiment 17

A system according to any of the preceding embodiments wherein the override functionality is activated only after the local authority has successfully identified herself/himself to the system.

Embodiment 18

A system according to any of the preceding embodiments wherein the system also comprises an e-learning functionality operative to train a child to remember "his" at least one predetermined location.

Embodiment 19

A system according to any of the preceding embodiments wherein the e-learning functionality gives the end-user audio feedback.

Embodiment 20

A system according to any of the preceding embodiments wherein the e-learning functionality includes gamification functionality.

Embodiment 21

A system according to any of the preceding embodiments wherein the system also comprises a test-configuration override functionality operative to allow any individual "local authority" end-user, from among the plurality of "local authority" end-users, to change at least one the system-selected location, but only for end-users within an individual group, from among the plurality of groups of end-users, which corresponds to the individual "local authority" end-user.

Embodiment 22

A system according to any of the preceding embodiments wherein the system also comprises a test-configuration override functionality operative to allow any individual "local authority" end-user, from among the plurality of "local authority" end-users, to, to select the image for presentation, but only to end-users within an individual group, from among the plurality of groups of end-users, which corresponds to the individual "local authority" end-user.

Embodiment 23

A system according to any of the preceding embodiments wherein the e-learning functionality provides at least 2 of the following learning stages: a first learning stage in which the at least one predetermined location is marked until the end-user has completed his selection thereof; a second learning stage in which the at least one predetermined location is marked for a period of time shorter than that required by a typical end-user to complete his selection of the location; and a third learning stage in which the at least one predetermined location is not marked but in which feedback is provided after the end-user has completed his selection of locations which he believes comprise the predetermined locations.

Embodiment 24

A system according to any of the preceding embodiments wherein in one learning stage a hint of the proper sequence in which a plurality of predetermined locations must be selected is provided, and in a subsequent learning stage, a hint indicating only whereabouts of the plurality of predetermined locations without indicating the sequence thereof, is provided.

Embodiment 25

A system according to any of the preceding embodiments wherein the access is granted by the what-you-know testing functionality only to low-threat child end-users pre-authorized by trusted special users.

Embodiment 26

A system according to any of the preceding embodiments wherein the access is granted to an end-user logged onto a work-station thereby to define a work-session, if a trusted user authenticates herself on the end-user's work-station as part of the end-user's work session and then authorizes access for the end-user.

Embodiment 27

A computer program product, comprising a non-transitory tangible computer readable medium having computer readable program code embodied therein, the computer readable program code adapted to be executed to implement a method for securing a computerized environment to prevent access thereto, other than by end-users who have passed a what-you-know authentication test, the method comprising the following operations.

Using a what-you-know testing functionality for administering a what-you-know user authentication test to at least one end-user, including presenting at least one image to an end-user, and using a processor for approving the end-user to enter the computerized environment if the end-user correctly selects at least one predetermined location within the image; and Providing a graphic what-you-know test-configuring functionality operative for displaying at least one system-selected location within the image; for controlling a graphic interface operative for accepting, from at least one end-user, a user-selected modification of the at least one system-selected location; and for controlling storage in a computer-implemented memory, for each individual end-user, of the user-selected modification as the individual end-user's at least one predetermined location; or if no user-selected modification exists for an individual end-user, storing the system-selected location as the individual end-user's predetermined location.

Embodiment 28

A secured computerized method comprising:

Providing a computerized environment secured to prevent access thereto, other than by end-users who have passed a what-you-know authentication test;

Using a what-you-know testing functionality operative for administering a what-you-know user authentication test to at least one end-user, including presenting at least one image to an end-user, and using a processor for approving the end-user to enter the computerized environment if the end-user correctly selects at least one predetermined location within the image; and Providing a graphic what-you-know test-configuring functionality operative for displaying at least one system-selected location within the image; providing a graphic interface operative for accepting, from at least one end-user, a user-selected modification of the at least one system-selected location; and storing in a computer-implemented memory, for each individual end-user, the user-selected modification as the individual end-user's at least one predetermined location; or if no user-selected modification exists for an individual end-user, storing the system-selected location as the individual end-user's predetermined location.

Young children just learning or about to learn reading and writing cannot interact with Text based menus or with buttons identified by symbols and text.

Certain embodiments of the present invention seek to provide an educational interactive platform for use in educational facilities such as elementary schools, special education facilities, and kindergartens, with parental- or teacher-supervision of specific functionalities; the system shown and described herein may be provided in conjunction with a social network for children.

Certain embodiments seek to provide audio stimulus that enables a pre-literate child to hear a characterization of the functionality of (e.g. actions performable by) a button or other input option before s/he activates the button or otherwise interacts with the input option.

Typically, buttons interact with the child intuitively in a manner analogous to existing buttons in existing computerized applications intended for adults.

Certain embodiments seek to provide a non-alphanumeric user interface for non-literate or semi-literate users, enabling these users to perform conventional computerized activities such as searching, surfing and processing data.

Certain embodiments seek to provide a system whose user interface is particularly suited for pre-, non-, or semi-literate end users of a computerized typically touch-based system such as children either too young to read or with learning disabilities. The system typically performs actions including but not limited to the action of orally presenting another action. The system typically enables the non-literate end-users to perform functions and realize goals such as sending messages, handling contacts, searching, etc., using a child-behavior-based logic, e.g. searching for information by selecting from a hierarchical category tree, and/or responding to a popup offering to save/discard/continue an unsent mail while exiting.

There is thus provided, in accordance with an embodiment of the present invention, a computerized system operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and a processor-controlled touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

There is also provided, in accordance with an embodiment of the present invention, a computer program product, comprising a non-transitory tangible computer readable medium having computer readable program code embodied therein, the computer readable program code adapted to be executed to implement a computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising providing a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and using a processor to control a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

There is further provided, in accordance with an embodiment of the present invention, a computerized method operative to perform a plurality of selectable system-actions responsive to user input, the method being accessible to non-literate users via a touch screen defining a plurality of touch screen locations respectively corresponding to the plurality of selectable system-actions, the touch screen being operative to detect and distinguish between first and second gestures, the method comprising providing a processor-controlled touch-triggered actor which, responsive to at least each first gesture applied by an end-user to an individual location within the touch screen, from among a plurality of touch screen locations, performs at least one individual action, from among the plurality of actions, which corresponds to the individual location; and using a processor to control a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location.

Also provided, excluding signals, is a computer program comprising computer program code means for performing any of the methods shown and described herein when the program is run on at least one computer; and a computer program product, comprising a typically non-transitory computer-usable or -readable medium e.g. non-transitory computer-usable or -readable storage medium, typically tangible, having a computer readable program code embodied therein, the computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory such as optical disks, CDROMs, DVDs, BluRays, magnetic-optical discs or other discs; RAMs, ROMs, EPROMs, EEPROMs, magnetic or optical or other cards, for storing, and keyboard or mouse for accepting. Modules shown and described herein may include any one or combination or plurality of: a server, a data processor, a memory/computer storage, a communication interface, a computer program stored in memory/computer storage.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

Certain embodiments of the present invention seek to provide an improved protected computerized social network facilitating secured electronic communication between and with children. For example, an educational interactive platform may be provided for use in educational facilities such as elementary schools, special education facilities, and kindergartens, with parental- or teacher-supervision of specific functionalities, typically including a social network for children.

Certain embodiments of the invention seek to provide a non-alphanumeric user interface for non-literate or semi-literate users, enabling these users to perform conventional computerized activities such as searching, surfing and processing data.

Certain embodiments of the invention seek to provide a networking functionality that each child may enter. The child may be shown a display of all children in her or his class, each identified by her or his name (first name only, or first and last names for older children) as entered by the teacher, and/or by her or his icon. The networking functionality allows each child to communicate with others, including interfacing safely with external communication networks e.g. email.

Certain embodiments of the invention seek to provide a computerized communication system for young children in which children communicate within a closed environment; e.g. with internal recipients who are all children and/or with recipients who are all deemed safe by a trusted authority such as a local authority, which may be authorized by a trusted central authority, such a local authority having credentials, typically sole credentials, for:

a. deeming certain recipients safe for a local group of children; and/or b. authorizing a child-specific authority, which then has credentials, typically sole credentials, for deeming certain recipients safe for that specific child.

For example, the Board of Education might give teachers sole authorization for building an address book for the child-users in their respective classes, and teachers might be authorized to give specific parents sole authorization for adding communicants e.g. external recipients they know and trust, to their child's address book.

The system may "whitelist" communication between internal recipients x, y only if x's address book includes y and vice versa.

Certain embodiments of the invention seek to provide a trusted authority which defines teachers. Teachers define pupils and parents. Typically, the system is pre-configured such that no communication is possible other than communication between authorized pairs of communicants. Rules defining authorized pairs of communicants may be as follows: pupils of a single teacher can all communicate with one another and, optionally, can also each communicate with their own parent/s and/or teacher. The system may also be pre-configured to enable first and second parents of first and second respective children studying in first and second classes enrolled in the system, to authorize communication between the first and second respective children if and only if so authorized by both children's parents. Example: Robbie and Janine who are in different classes may be able to communicate, if and only if Robbie is on Janine's parents' whitelist, and Janine is on Robbie's parents' whitelist. The system may also be pre-configured to enable a parent to authorize communication between his child and specified users, identified e.g. by their email addresses or other contact information and aliases (such as cousin Jack). Typically, the system includes an internal communication system supporting communication among internal recipients e.g. registered teacher-users and among registered pupil-users and also between these groups, all only if and as authorized by the rules. The system also may include an external communication system supporting communication between registered users such as teachers and children, and external recipients such as parents, relatives and neighbors, or even among external users, all only if and as authorized by the rules.

Typically, the system enables each teacher to efficiently send an introductory message to each parent in her class, using contact information that the parents previously provided, and to provide to each parent, a user name and (typically alphanumeric) password, thereby granting that parent access to the parents' user interface. This prevents children from gaining access to the parents' user interface.

The parent's user interface allows a (first) parent to request contact between his (first) child and a second child belonging to a different class (and/or Parent email). Typically, the second child may be identified by his or her name and class. The system then retrieves the parental contact information for the second child and asks the second child's parent to authorize contact between his child and the first child. The request to the second child's parent may include a message sent by the first parent; this allows the first parent to concoct a message which allows the second parent to authenticate the first parent e.g. by referring to past experiences or knowledge shared by both parents or both children.

Requesting contact and authorizing a contact requested by another parent can only be effected from within the parent user interface to prevent unauthorized persons from authorizing contact between respective children.

According to certain embodiments, the request to the second child's parent may be an email including a link; if a suitable cookie (say) indicates that the parent is logged in, then the parent is brought straight to the page within the parent user interface which enables him to authorize contact with whichsoever children whose parents have requested contact. If the parent is not logged in, then the parent is routed first to the parent user interface login page, and only subsequently, straight to the page within the parent user interface which enables him to authorize contact with whichsoever children whose parents have requested contact.

According to certain embodiments, if responsible adults' emails have been defined, the system, typically via an automatic process, sends mails to the responsible adults with the user name and password for their child and pin for the parent, and instructions on how to use the system. Responsible adults are requested to assist their child during the first time they login to the system. In case that responsible adults (=parents) emails were not added, the teacher can print notes (per child) with username password and instructions and hand them to the responsible adults.

There are typically 2 types of recipients recognized by the system: Internal recipient—receives his mail inside the system; and External recipient.

There may be 2 types of students (internal recipients) in the system: Student defined within class who work either from a class workstation or, optionally, from home; and a Private user who does not belong to any class defined by the system and typically works only from home.

According to certain embodiments, the system is operative for allowing child end-users to communicate only with a white-list defined for them. The white list may include a list pre-defined per kindergarten not per-child and includes all the children in that kindergarten and optionally adults serving that kindergarten. The white list may be pre-defined by a trusted authority, either directly or via a teacher designated for that kindergarten by a trusted authority.

Alternatively or in addition, each child's white list includes communicants defined for each child personally by a pair of adults designated as being responsible for the 2 relevant children; each such adult may be one known by a trusted authority to be the child's parent/guardian.

The present invention typically includes at least the following embodiments:

Embodiment 1'

A secure social networking system for pupils including:
a mail server including a processor, operative to:
 a. communicate with external recipients via a gateway to at least one external communication network serving the external recipients; and
 b. communicate with at least one internal recipient including pupil end-users, thereby to define an internal secured network;
computer memory/storage accessible by the server and operative to store:
 associations between individual parents who are nodes in the at least one external communication network and individual internal recipients from among the pupil end-users; and
white-lists of authorized communicants for individual pupil end-users, provided by the server;
wherein the server is operative to interface with:
 a secured parent environment including a parent's user-interface, operative, responsive to control by a processor, to allow each of said individual parents whose association with a given pupil from among the pupil end-users is stored in said memory, to authenticate himself and subsequently to define for the server, a white-list of pupils with whom the individual parent authorizes his child (said given pupil) to communicate; and
 a secured pupil environment including a pupil's user-interface, operative, responsive to control by a processor, to allow each first pupil to communicate via said server with any pupils appearing on the whitelist of internal recipients stored in the memory for the first pupil;
 wherein for at least one first and at least one second pupil end-user from among the 30 pupil end-users, the server's logic is configured such that the whitelist provided to the memory for the first pupil end-user includes the second pupil, if and only if, the first and second pupils' parents, as defined by said associations, have both, via their respective parent's user-interface, authorized communication between the first and second pupils, thereby to define the first and second pupils as an authorized pair of communicants.

Embodiment 2'

A system according to any of the preceding embodiments and also comprising a secured teacher environment including a teacher's user-interface operative, responsive to control by a processor, to allow each of a plurality of teacher-users, pre-defined by a trusted authority, to define a class having a plurality of pupils including defining, for each pupil in the plurality of pupils, a pupil's contact information; and parent contact information through which the server contacts the pupil's parent via the external communication network.

Embodiment 3'

A system according to any of the preceding embodiments wherein, for any pair of first and second pupils from among the pupil end-users belonging to different classes, the server's logic is configured such that the whitelist provided to the memory for the first pupil end-user includes the second pupil, if and only if, the first and second pupils' parents as defined by said associations, have both, via their respective parent's user-interface, authorized communication between the first and second pupils, thereby to define the first and second pupils as an authorized pair of communicants.

Embodiment 4'

A system according to any of the preceding embodiments wherein the whitelist includes all pupils within the individual pupil's class.

Embodiment 5'

A system according to any of the preceding embodiments and also comprising a workstation operative to communicate with the server via the external communication network and operative to provide a parent end-user with the secured parent environment including the parent's user-interface operative to allow the parent end-user, once his association with a given pupil from among the pupil end-users is stored in said memory, to authenticate himself and subsequently to define pupils with whom the parent end-user authorizes his child to communicate.

Embodiment 6'

A system according to any of the preceding embodiments wherein the parent user-interface is operative:
 to allow each individual parent whose association with a given pupil and a given class is defined by said teacher user-interface, to send requests, through the system, to parents of pupils belonging to classes other than said given class asking those parents to authorize their children respectively to communicate with the given pupil; and
 to allow each particular parent who has received an individual request sent by the individual parent, to approve the individual request, thereby to define the individual parent's child (said given pupil) and the particular parent's child as an authorized pair of communicants.

Embodiment 7'

A system according to any of the preceding embodiments and also comprising an internal communication system supporting communication among registered teacher-users pre-defined as authorized pairs of communicants.

Embodiment 8'

A system according to any of the preceding embodiments and also comprising an introduction functionality operative to:

receive, from each teacher, externally provided contact information that the parents previously provided to the teacher;

store the externally provided contact information; and facilitate the teacher's transmission of introductory messages to each parent in the teacher's class, using said externally provided contact information, wherein the introductory message sent to each specific parent, assigns to the specific parent a user name and password, granting that specific parent access to said parent-user interface.

Embodiment 9'

A system according to any of the preceding embodiments wherein said contact information comprises an email address.

Embodiment 10'

A system according to any of the preceding embodiments wherein said contact information comprises a cell phone number.

Embodiment 11'

A system according to any of the preceding embodiments and wherein said computer memory includes:

a teacher database including a teacher data record for each teacher in a supported teacher population and wherein each teacher data record is operative for storing a teacher's contact information;

a pupil database including a pupil data record for each pupil in a supported pupil population and wherein each pupil data record is operative for storing a pupil's contact information and an association between the pupil and an individual teacher in the supported teacher population; and a parental database including a parent data record for each parent in a supported parent population and wherein each parent data record is operative for storing a parent's contact information and an association between the parent and an individual pupil in the supported pupil population.

Embodiment 12'

A system according to any of the preceding embodiments wherein, if an individual parent is known to be logged in to the system, the individual parent is brought straight to a web-page within the parent user interface which enables the individual parent to authorize contact with whichsoever pupils whose parents have requested contact with the individual parent's child.

Embodiment 13'

A system according to any of the preceding embodiments wherein, if an individual parent is deemed not to be logged in to the system, the parent is routed first to a login page of the parent user interface login page, and only subsequently, straight to a web-page within the parent user interface which enables the individual parent to authorize contact with whichsoever children whose parents have requested contact with the individual parent's child.

Embodiment 14'

A system according to any of the preceding embodiments and also comprising a workstation operative to communicate with the server via the internal secured network and operative to provide a secured pupil environment including a pupil's user-interface operative to allow each first pupil to communicate via said server with any pupils appearing on the whitelist of internal recipients stored in the memory for the first pupil.

Embodiment 15'

A system according to any of the preceding embodiments wherein the system is pre-configured such that no communication is possible other than communication between authorized pairs of communicants.

Embodiment 16'

A system according to any of the preceding embodiments wherein authorized pairs of communicants include any pair of pupils of a single teacher.

Embodiment 17'

A system according to any of the preceding embodiments wherein authorized pairs of communicants include any pupil and her/his teacher.

Embodiment 18'

A system according to any of the preceding embodiments wherein authorized pairs of communicants include any pupil and her/his parent.

Embodiment 19'

A system according to claim 1 and wherein said computer memory includes a teacher database including a teacher data record for each teacher in a supported teacher population and wherein each teacher data record is operative for storing a teacher's contact information.

Embodiment 20'

A system according to any of the preceding embodiments and wherein said computer memory includes a pupil database including a pupil data record for each pupil in a supported pupil population and wherein each pupil data record is operative for storing a pupil's contact information and an association between the pupil and an individual teacher in a supported teacher population.

Embodiment 21'

A system according to any of the preceding embodiments and also comprising a gateway via which the mail server communicates with the external recipients and wherein the gate-way is one-way allowing internal recipients to send communications via the server to external recipients but not allowing external recipients to send communications to internal recipients.

Embodiment 22'

A computer program product, comprising a non-transitory tangible computer readable medium having computer readable program code embodied therein, said computer readable program code adapted to be executed to implement any method shown and described herein.

Also provided, excluding signals, is a computer program comprising computer program code means for performing any of the methods shown and described herein when said program is run on at least one computer; and a computer program product, comprising a typically non-transitory computer-usable or -readable medium e.g. non-transitory computer-usable or -readable storage medium, typically tangible, having a computer readable program code embodied therein, said computer readable program code adapted to be executed to implement any or all of the methods shown and described herein. The operations in accordance with the teachings herein may be performed by at least one computer specially constructed for the desired purposes or general purpose computer specially configured for the desired purpose by at least one computer program stored in a typically non-transitory computer readable storage medium. The term "non-transitory" is used herein to exclude transitory, propagating signals or waves, but to otherwise include any volatile or non-volatile computer memory technology suitable to the application.

Any suitable processor/s, display and input means may be used to process, display e.g. on a computer screen or other computer output device, store, and accept information such as information used by or generated by any of the methods and apparatus shown and described herein; the above processor/s, display and input means including computer programs, in accordance with some or all of the embodiments of the present invention. Any or all functionalities of the invention shown and described herein, such as but not limited to operations within flowcharts, may be performed by any one or more of: at least one conventional personal computer processor, workstation or other programmable device or computer or electronic computing device or processor, either general-purpose or specifically constructed, used for processing; a computer display screen and/or printer and/or speaker for displaying; machine-readable memory e.g. for storing the data repositories shown in FIG. 1, such as but not limited to optical disks, CDROMs, DVDs, BluRays, magnetic-optical discs or other discs; RAMs, ROMs, EPROMs, EEPROMs, magnetic or optical or other cards, for storing. keyboard or mouse or other input device may be employed. Modules shown and described herein may include any one or combination or plurality of: a server, a data processor, a memory/computer storage, a communication interface, a computer program stored in memory/computer storage e.g. for storing the data repositories shown in FIG. 1.

The term "process" as used above is intended to include any type of computation or manipulation or transformation of data represented as physical, e.g. electronic, phenomena which may occur or reside e.g. within registers and/or memories of at least one computer or processor. The term processor includes a single processing unit or a plurality of distributed or remote such units.

The above devices may communicate via any conventional wired or wireless digital communication means, e.g. via a wired or cellular telephone network or a computer network such as the Internet.

The apparatus of the present invention may include, according to certain embodiments of the invention, machine readable memory containing or otherwise storing a program of instructions which, when executed by the machine, implements some or all of the apparatus, methods, features and functionalities of the invention shown and described herein. Alternatively or in addition, the apparatus of the present invention may include, according to certain embodiments of the invention, a program as above which may be written in any conventional programming language, and optionally a machine for executing the program such as but not limited to a general purpose computer which may optionally be configured or activated in accordance with the teachings of the present invention. Any of the teachings incorporated herein may, wherever suitable, operate on signals representative of physical objects or substances.

The embodiments referred to above, and other embodiments, are described in detail in the next section.

Any trademark occurring in the text or drawings is the property of its owner and occurs herein merely to explain or illustrate one example of how an embodiment of the invention may be implemented.

Unless specifically stated otherwise, as apparent from the following discussions, it is appreciated that throughout the specification discussions, utilizing terms such as, "processing", "computing", "estimating", "selecting", "ranking", "grading", "calculating", "determining", "generating", "reassessing", "classifying", "generating", "producing", "stereo-matching", "registering", "detecting", "associating", "superimposing", "obtaining" or the like, refer to the action and/or processes of at least one computer/s or computing system/s, or processor/s or similar electronic computing device/s, that manipulate and/or transform data represented as physical, such as electronic, quantities within the computing system's registers and/or memories, into other data similarly represented as physical quantities within the computing system's memories, registers or other such information storage, transmission or display devices. The term "computer" should be broadly construed to cover any kind of electronic device with data processing capabilities, including, by way of non-limiting example, personal computers, servers, computing system, communication devices, processors (e.g. digital signal processor (DSP), microcontrollers, field programmable gate array (FPGA), application specific integrated circuit (ASIC), etc.) and other electronic computing devices.

The present invention may be described, merely for clarity, in terms of terminology specific to particular programming languages, operating systems, browsers, system versions, individual products, and the like. It will be appreciated that this terminology is intended to convey general principles of operation clearly and briefly, by way of example, and is not intended to limit the scope of the invention to any particular programming language, operating system, browser, system version, or individual product.

Elements separately listed herein need not be distinct components and alternatively may be the same structure. A statement that an element or feature may exist is intended to include (a) embodiments in which the element or feature exists; (b) embodiments in which the element or feature does not exist; and (c) embodiments in which the element or feature exist selectably e.g. a user may configure or select whether the element or feature does or does not exist.

Any suitable input device, such as but not limited to a sensor, may be used to generate or otherwise provide information received by the apparatus and methods shown and described herein. Any suitable output device or display may be used to display or output information generated by the apparatus and methods shown and described herein. Any suitable processor/s may be employed to compute or generate information as described herein e.g. by providing one or more modules in the processor/s to perform functionalities described herein. Any suitable computerized data storage/computer memory may be used to store information received by or generated by the systems shown and described herein e.g. for storing the data repositories shown in FIG. 9. Functionalities shown and described herein may be divided between a server computer and a plurality of client computers. These or any other computerized components shown and described herein may communicate between themselves via a suitable computer network.

BRIEF DESCRIPTION OF THE DRAWINGS

Certain embodiments of the present invention are illustrated in the following drawings:

FIGS. 2, 4 are simplified flowchart illustrations of methods provided in accordance with certain embodiments and useful either separately or in combination, e.g. in conjunction with the system of FIG. 1. The method of FIGS. 2, 4 typically comprises some or all of the illustrated operations, suitably ordered e.g. as shown.

FIGS. 5a-5b, taken together, form a simplified flowchart illustration of a method constructed and operative in accordance with an embodiment of the present invention.

FIG. 6 is a simplified flowchart illustration of a method constructed and operative in accordance with another embodiment of the present invention.

FIG. 10 is a simplified flowchart illustration of an example method allowing parents to define their respective children as a pair of authorized communicants; responsively the server typically adds the first child to the second child's white-list and vice versa. The method of FIG. 10 typically comprises some or all of the illustrated operations, suitably ordered e.g. as shown.

Figure 1:
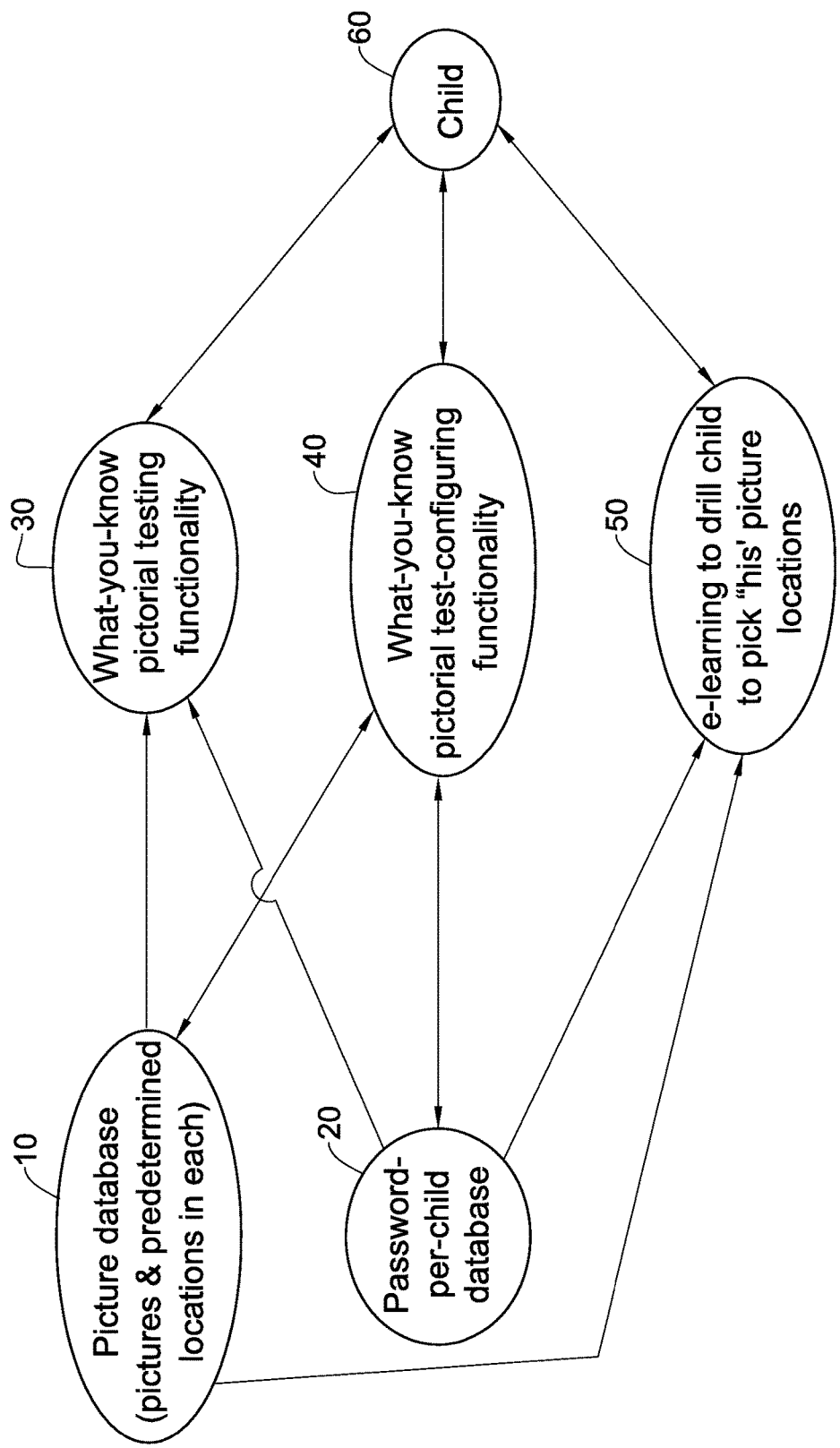
FIG. 1 is a simplified functional block diagram illustration of a pictorial password system protecting access to a secured environment such as a secured closed network, providing access only to users who have passed a what-you-know authentication test based on a pictorial password; some or all of the illustrated blocks may be provided.

Methods and systems included in the scope of the present invention may include some (e.g. any suitable subset) or all of the functional blocks shown in the specifically illustrated implementations by way of example, in any suitable order e.g. as shown.

Computational components described and illustrated herein can be implemented in various forms, for example, as hardware circuits such as but not limited to custom VLSI circuits or gate arrays or programmable hardware devices such as but not limited to FPGAs, or as software program code stored on at least one tangible or intangible computer readable medium and executable by at least one processor, or any suitable combination thereof. A specific functional component may be formed by one particular sequence of software code, or by a plurality of such, which collectively act or behave or act as described herein with reference to the functional component in question. For example, the component may be distributed over several code sequences such as but not limited to objects, procedures, functions, routines and programs and may originate from several computer files which typically operate synergistically.

Any method described herein is intended to include within the scope of the embodiments of the present invention also any software or computer program performing some or all of the method's operations, including a mobile application, platform or operating system e.g. as stored in a medium, as well as combining the computer program with a hardware device to perform some or all of the operations of the method.

Data can be stored on one or more tangible or intangible computer readable media stored at one or more different locations, different network nodes or different storage devices at a single node or location.

It is appreciated that any computer data storage technology, including any type of storage or memory and any type of computer components and recording media that retain digital data used for computing for an interval of time, and any type of information retention technology, may be used to store the various data provided and employed herein. Suitable computer data storage or information retention apparatus may include apparatus which is primary, secondary, tertiary or off-line; which is of any type or level or amount or category of volatility, differentiation, mutability, accessibility, addressability, capacity, performance and energy use; and which is based on any suitable technologies such as semiconductor, magnetic, optical, paper and others.

It is appreciated that any reference herein to, or recitation of, an operation being performed is, e.g. if the operation is performed at least partly in software, intended to include both an embodiment where the operation is performed in its entirety by a server A, and also to include any type of "outsourcing" or "cloud" embodiments in which the operation, or portions thereof, is or are performed by a remote processor P (or several such), which may be deployed off-shore or "on a cloud", and an output of the operation is then communicated to, e.g. over a suitable computer network, and used by, server A. Analogously, the remote processor P may not, itself, perform all of the operation and instead, the remote processor P itself may receive output/s of portion/s of the operation from yet another processor/s P', may be deployed off-shore relative to P, or "on a cloud", and so forth.

DETAILED DESCRIPTION OF CERTAIN EMBODIMENTS

Certain embodiments include an educational interactive platform for use in educational facilities such as elementary schools, special education facilities, and kindergartens, with parental- or teacher-supervision of specific functionalities, typically including a social network for children.

FIG. 1 is a simplified functional block diagram illustration of a pictorial password system protecting access to a secured environment such as a secured closed network, providing access only to users who have passed a what-you-know authentication test.

Typically, the network security is not solely based on the pictorial password system; instead other layer/s of security may be provided since pictorial password systems may not be as secure as is required by the total situation. For example:

some users such as unknown adults may be totally barred from gaining access to the system; and/or some users may gain access to the system if authorized by trusted special users; and/or access is granted responsive to presentation of a pictorial password, only to end-users pre-authorized by trusted special users; for example, only to children pre-registered by a trusted adult caregiver thereof. This provides a double or triple layer of security: the what-you-know security of the pictorial password; and/or the fact that the only end-users eligible to interact with the what-you-know testing functionality are those authorized by trusted special users (kindergarten teachers e.g.); and/or the fact that the only end-users eligible to interact with the what-you-know testing functionality are low-threat end-users such as small children.

Some or all (any suitable subset) of the following may be provided:

a. a picture database/repository/library 10 storing digital images and typically, predetermined locations in each b. a password-per-child database/repository/library 20 storing, for each child-user, a pointer to "his" picture in library 10 and indication of "his" set or sequence of locations (typically a subset of the predetermined locations defined within "his" picture in library 10)

c. what-you-know pictorial testing functionality 30 operative to grant a child-user access to the secured environment if and only if the child-user successfully presents his password by indicating on "his picture", "his" set or sequence of locations d. what-you-know pictorial test-configuring functionality 40 operative to allow a user such as a child or his teacher, to select a picture e.g. from the database 10 and to select locations therewithin for storage in database 20; typically by using an input device to move pre-selected locations from place to place within the picture the user has selected; and e. e-learning functionality 60 to drill a child (60) to reliably pick "his' picture locations, typically using gamification.

Typically, an override by teacher option is provided, e.g. so child will not get too frustrated. The override allows a child to get in the password-protected secured environment even without a password he's forgotten at the discretion of the child's teacher subsequent to her identifying herself e.g. using a PIN.

According to certain embodiments, a what-you-know testing functionality assigns a pictorial password to each child; this assignment may be stored and maintained and updated as appropriate in a suitable computer database. The password may be system-assigned or may be determined for the what-you-know testing functionality by the teacher using her teacher interface or may be defined by the child himself, typically under adult supervision. Typically, the child is shown a picture by the what-you-know testing functionality e.g. a randomly selected or teacher/child user-selected one of a library of available pictures. Assignment of picture to child is typically mediated by the test-configuring functionality described herein. The password may then comprise a sequence or set of locations e.g. zero-dimension point locations (or larger locations) within the picture which the child selects, e.g. using a mouse. Each point location must typically be selected with a typically predefined level of precision, such as within a uniformly sized (or non-uniformly sized e.g. larger/smaller level/s of precision for larger/smaller objects defined within the picture), circle around each point location. For example, the system might pre-define that a point location is correctly selected by the child if the child clicks on a location within a 1-cm radius of the point location. The child is deemed by the what-you-know testing functionality to have presented his password, if he successfully selects the locations allocated to him, each within its (or a uniform) predetermined precision level.

According to certain embodiments, each picture in the picture database is stored as a collection of objects such as animals, tools, foods, plants, household objects or toys whose locations within the picture grid are known; in this case, the password may comprise a sequence of set of objects which may each be deemed to have been successfully selected if the child positions his user input device e.g. cursor within the borders of each object rather than within a predefined level of precision defined around a point.

It is appreciated that adult users, once assigned (e.g. self-assigned) a password, typically including a sequence of alphanumeric characters, succeed in remembering that password and/or in storing it in a secure location. Child users may not be capable of either of these skills. Nonetheless, child users are assigned a password according to certain embodiments, however, typically, gamified password drilling functionality also termed herein "e-learning functionality", is provided by the system's e-learning functionality to teach the child his password. Typically, a suitable e-learning branched sequence is defined within the e-learning functionality; for example toward the top of the tree the child is shown "his" picture in which "his" 3 (say) locations which constitute his password is marked e.g. by a circle surrounding that location, typically having a radius corresponding to the required level of precision. Each such location may even be marked with numbers 1, 2, 3 (or 1/2/3 dots), all of course superimposed onto the picture. Later in the sequence, as the child demonstrates mastery, the numbers 1, 2, 3 may be removed, or the circle may be shown only when the child hovers over the right location, and so forth. Any suitable gamification technique may be provided such as oral words of praise for the child or rewards for successful learning such as virtual points.

According to certain embodiments, a child selecting a difficult-to-find location may receive a warning (e.g. if the child selects a location and an image processing functionality determines that this location corresponds, within the child's selected picture, to a location including no edges such as a sky location). Conversely, if the location selected falls on edges in the picture (e.g. the cow's nose, or the flower's petal which is about the same size as the required precision level, or the intersection between the path and the tree), no warning is provided or a positive message is provided.

In the picture library stored in the picture database, each digitally represented picture may include solid blocks or areas of colors with clear edges between them as opposed to gradations of color as in a natural scene. For each picture, N e.g. (say) 50 predetermined locations may be stored, corresponding to locations which a child can easily find repeatedly. These may be determined manually, e.g. by the graphic artist which provided the pictures, or may be found by suitable edge detection functionality. Typically, when a child—typically teacher-supervised—selects his password, an initial password is suggested to him, e.g. the system's test-configuring functionality, e.g. by showing the child a picture randomly or otherwise selected by the test-configuring functionality, on which n (say 3) typically system-selected locations (which may be randomly selected from among the N) are pre-marked.

An advantage of a test-configuring functionality operative for suggesting a plurality of n initial locations to the child, is that the child can then easily interact with the test-configuring functionality to modify the password that has been seen on his workstation's screen, what amounts to an illustration of one possible password. Typically, the test-configuring functionality allows the child to modify her or his password by:

a. showing the child her or his picture, on which the current locations constituting the child's password are marked (e.g. by a red dot)

b. superimposing an indication of order on the picture e.g. by marking the first, second, third . . . locations in a password defined as a sequence of locations. For example, the password is: tip of dog's tail followed by tip of sun's ray and finally by point at which house intersects with barn. The picture is then displayed to the child on her workstation and a 1 appears adjacent to the red dot marking the tip of the dog's tail; a 2 appears adjacent to the red dot marking the tip of sun's ray and a 3 appears adjacent to the red dot marking the point at which house intersects with barn.

c. detecting a user action of simply moving a number 1 marking a location such as the cow's ear, to a different location such as the cat's nose. Number 2 might be moved from the top of the chimney to the bird's nest in the tree, and so forth. A "move" may be defined, if the user input device is a mouse, by a first click at the old location, followed by rolling of the cursor and a second click in the new location.

d. interpreting these user actions as changes in the user's password. For example, if the user's password was the following sequence: cow's ear; chimney top; kitten's eye; the user's password would now be: cat's nose; bird's nest; kitten's eye.

e. storing, for each individual end-user, the user-selected modification as the individual end-user's password comprising locations predetermined by him; or if no user-selected modification exists for an individual end-user, storing original system-selected location/s as the individual end-user's password.

Another advantage of the test-configuring functionality shown and described herein is that there is then only one procedure to teach the child, namely how to modify a password, and there is no need to teach the child one procedure for initially selecting his password and a different procedure for modifying a password already selected. Typically, instead of initially selecting his password, the child interacts with the test-configuring functionality to modify a password selected for him.

The login system typically uses signed cookies (created e.g. on the server) to enable the system to support a single sign on between the various sites that provide the service.

The system may support several User roles e.g. all or any subset of the following roles:

System Administrator—this role enables to manage the system. It enables to create modify and delete accounts of all types and to reset passwords ("trusted authority")

Organization administrator—Organization administrators can create classes, assign them to teachers and access organizational statistics.

Teacher ("trusted user")

Staff member

Student ("child user")

Parent/adult carer

Content Management User 2 separate levels of Login may be supported: Primary Login and Secondary Login; so as to define separate modes such as class mode and home mode.

Primary login uses conventional username and password notation.

Any suitable technology may be used for Primary login e.g. Microsoft .Net Forms authentication or Open Authentication O-Auth.

Typically, the technology facilitates a secure sessionless connection between the client and the servers to promote efficiency of the servers which do not need to maintain state and to provide for easy scaling of the system e.g. by adding front end servers; since there is no session, consecutive requests from a single client can be served by different front end servers.

```
If the user identifies himself during primary login as a teacher then
{
    Secondary Login happens, e.g. some or all of:
    The system shows the list of students and requests a secondary identification
    the identification is by means of pointing on the student name from the list that is
shown (the class list + teacher + staff)
    and then the appropriate picture login is shown and the ordered clicks on the picture
password are checked.
    IF correct password has been clicked (right places at the right order)
    {
        The system marks to itself that it is in "Class Mode" and Marks the student
that is now working.
            (by means of StudentID and signed cookie –
            so from here on each access to the server has 2 approved Identities:
                Teacher + Student to show that we are in class mode and give
                the class identity (classes are typically id'ed by teacher since
                teacher is unique to class) and the identity of the student that is
                now working).
        The user is transferred to the application selection page - (e.g. a "What
would you like to do now" page).
        At this stage when in home mode, the parent/adult carer can login using a PIN-
based a secondary login process; analogously, a teacher can typically log in, identifying
himself or herself using her or his PIN, when the child is at kindergarten, working in class
mode.
    }
}
Else if the user identify himself during the primary login as a student then
{
    The system marks to itself that it is in "Home Mode" and Marks the student that is
```

```
now working.
    The user is transferred to the application selection page - (What would you like to do
now).
}
```

Typically, when a user logs in (primary login) to the system (SSL is enforced—so as not to pass credentials in the clear) the user credentials (username and password) are checked (password may be stored securely e.g. using a one way encryption algorithm (to disable the ability of retrieving user passwords). If the credentials are matched, the server typically creates a "login cookie". The cookie typically includes user id cookie expiration time which is typically encrypted and signed. The signature is typically added to the cookie. The cookie is typically returned as part of the response to the login request, typically together with a success indication whereas in case of failure, there is typically no indication whether the username and/or password were incorrect.

From that point, each request that the client sends to the server typically includes the "login cookie". The server validates the signature and if correct typically entitles the user that is assigned to it to grant the right permissions to that user (For example access to personal data—private address book, class resources etc.).

The teacher role is a "special case". Teacher credentials typically enable teachers, once they have authenticated themselves e.g. by entering a PIN, e.g. to a work-session of a child end-user associated with that teacher, to perform operations of 2 types:

Teacher's functions may include:
  a. Manage the class definitions (for example manage the student list, define for each student his responsible adult email address, send student user names and passwords to the responsible adults) and/or
  b. Use the tools with the teacher's identity (for example read the email sent to the teacher and reply to the students, define new charts and polls using how much/how many).

Student's functions: students may use the system in "class mode" as opposed to using the system in "home mode" (from home). Typically these modes are not child-user selectable; instead different login levels are typically required.

When students use the system from home, they typically log in with their credentials which grants them a role of student. This allows them to use the tools from home. Not all activities that are defined for usage in class are necessarily open for usage at home and not all home activities are necessarily open in the class. For example, the system might be configured such that private address book is managed only from home mode, or teachers can decide to use some of their polls only in "class mode".

Typically, when students use the system at class, they need to identify themselves. The system typically displays a list of all students, typically also of the teacher and the staff. Each name (student/teacher/staff) can be accompanied by a symbol or a picture. Typically, pictures typically enjoy privacy; e.g. only members of a class have access to the pictures of the students in the class. This may be achieved using a special "Picture service". The service receives a picture code (built of a Class-ID+Student-ID+Picture-Version) which validates that the "login cookie" has permission to access it and, if it has access, it returns the requested image. Clicking on the teacher name pops up a modal dialog that requests the teacher PIN (in order to prevent students from accessing the "teacher's functions" (1.a and 1.b in the list above). Only after keying the correct key, the teacher can proceed to using the "teacher's functions".

Typically, only after the student thus identify themselves, a "Picture Login" system is used.

The "Picture Login" system typically maintains, in the picture database of FIG. 1, a list of images available for "Picture Login". Each image typically contains several memorable points. For each student the system typically stores a link to the picture of the student and 3 (say) pairs of ordered (x,y) coordinates. The student is expected to point and click/tap (e.g. in the right order) on the points of interest selected as his password.) When the student (child end-user) completes clicking/tapping (say 3 times) the client transfers the ID of the selected student+the 3 coordinates that the student clicked to the server. The server typically verifies that the clicked coordinates are near the 3 ordered (x,y) coordinate pair of the student—e.g. within a given radius whose size fits the coordination and ability of young children. The server also typically validates that the student belongs to the class of the logged in teacher using the "login cookie". If all is OK, the system typically creates a second cookie "Picture Login Cookie" that typically comprises a Student-ID+Time. The system then signs on the cookie and the signature is added to the cookie. From that point and on each time a request is sent to the server, both cookies are typically passed and both cookies are checked, e.g. for existence, tampering and/or content. Based on the cookies, access is granted to data.

When pointing and clicking/tapping on the picture password the user typically has the ability to restart the cycle. (even if he did not click/tap 3 times).

Figure 3:
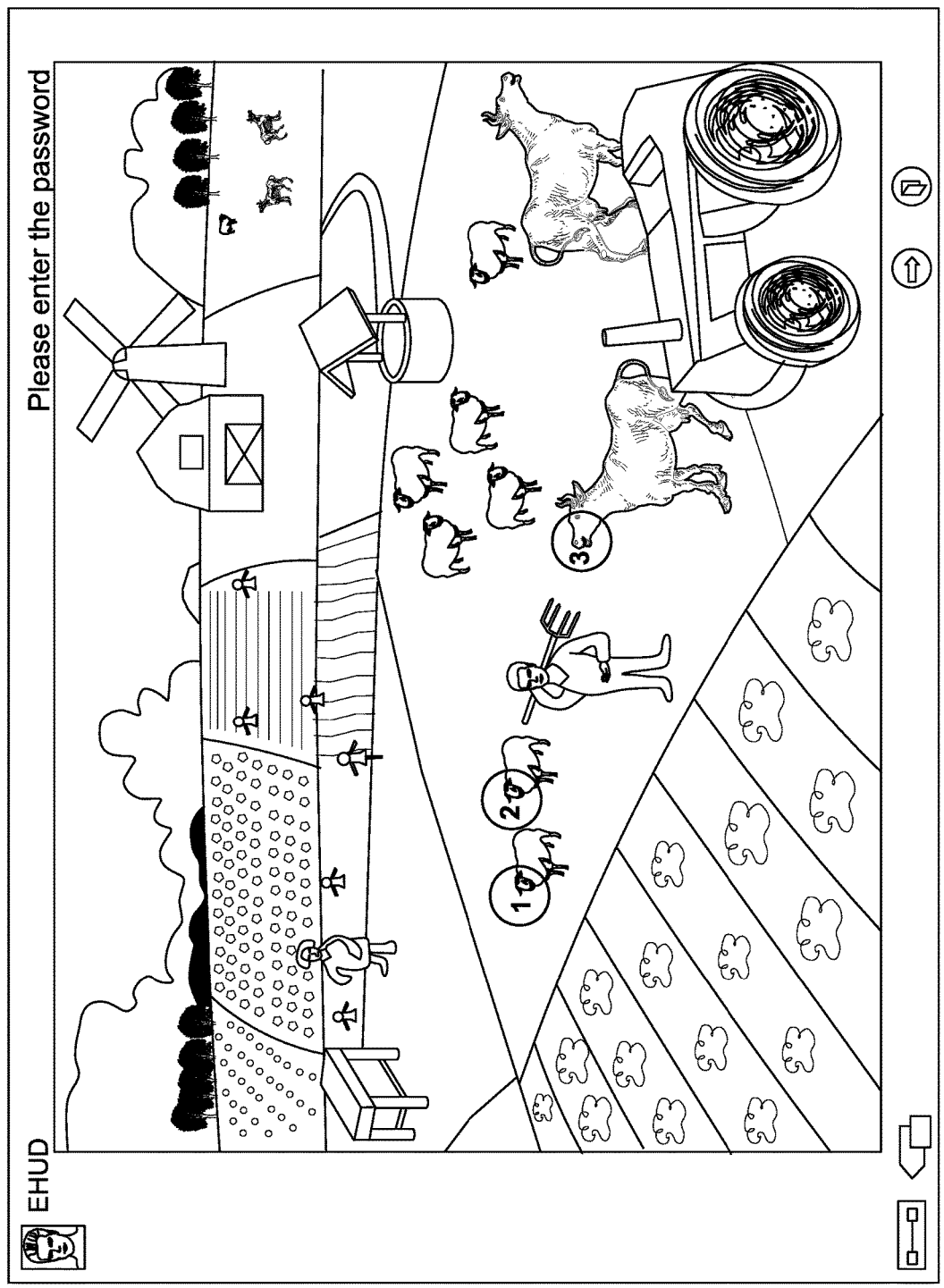
FIG. 3 is a simplified pictorial illustration of a display including an image and an overlaid sequence of (initially) numbered locations, displayed only before the child takes the authentication test (selects locations in the picture/image) or also while the child takes the test, all in accordance with certain embodiments.

If the student does not remember his password, he can typically request help from the teacher. The teacher (after entering the "teacher PIN", typically within a work session of a child-user associated with the teacher, typically on a workstation associated with the teacher and child's class) can then:

1. Take the "quick route" for the child (postpone the teaching/training of password and revert the student straight to the task he needs to perform) by indicating that she identified the student and grant him access to the system although the student did not click/tap the picture password.
  2. show the child the password. Typically the system draws 3 circles with numbers reflecting the click/tap order e.g. as shown in FIG. 3. The teacher (or other predefined role) can then move the points and position them at any location on the picture. The teacher can also replace the picture e.g. by selecting the picture from a list or uploading a new picture.
  3. start a training (e-learning) session that, using gamification techniques, trains the student to remember and correctly key the picture password. The training session is built of stages. Each stage is repeated until a stop-criterion is reached e.g. the students complete the password remembering task correctly n times in a row.

The training session typically uses voice to instruct the student what to do and gives visual and voice feedback.

The training stages may include some or all of the following e.g. as shown in FIG. 4:

In a first stage, the system draws on the picture n, e.g. 3 numbered circles (e.g. with half transparent background) indicating the location and order of the password. The system requests the student to click/tap on them in the right order (1-3). Each time that the student taps correctly he gets positive feedback (e.g. a voice and/or pleasant icon such as a smiley face that appears on the tapped point or location). If the student fails to tap at the right 15 location he gets voice feedback and the system hints to him of the right place to click/tap. The count of N, e.g. 3 good cycles is typically reset to 0. If the student clicks/taps correctly on the n'th e.g. $3^{rd}$ point and there was no error during this cycle, the number of correct cycles is incremented. If this was the $N^{rd}$ cycle, the level ("stage") is advanced to level/stage 2.

In a second stage the system shows n, e.g. 3 empty circles (with a border and/or transparent background—no numbers) on the screen and requests the student to click/tap on them using the right order (that he learned during level 1). Each time that the student taps correctly, he gets positive feedback (e.g. by voice and smiley face that appears on the tapped point). If the student fails to tap at the right location he gets voice feedback and the system hints of the right place to click/tap. The count of N, e.g. 3 good cycles is typically reset to 0. If the student clicks/taps correctly on the n'th e.g. $3^{rd}$ point and there was no error during this cycle, the number of correct cycles is incremented. If this was the $N^{rd}$ cycle, the level ("stage") is advanced to level/stage 3.

In a third stage the system does not show circles on the screen, and instead just shows the picture without overlay. The system may orally request the student to click/tap on the circles using the right order. Each time that the student taps correctly he gets positive feedback (by means of voice and a smiley face that appears on the tapped point). If the student fails to tap at the right location he gets voice feedback and the system hints him of the right place to click/tap. (The count of n, e.g. 3 good cycles is reset to 0). If the student clicks/taps correctly on the n'th e.g. $3^{rd}$ point and there was no error during this cycle, the number of correct cycles is incremented. If this was the $3^{rd}$ cycle, the training is complete and the student is requested to tap the password (with no feedback—same as in a regular picture password login). At the completion of the login the student is granted access to the system.

More generally, the e-learning of the password typically includes stages varying from easy to hard, and differing from one another along some or all of the following dimensions:

a. password locations are displayed during the entire time period in which child enters password (easy; child is training to enter accurately not to remember) vs. password locations are displayed transiently just before child enters password (as "hints") and then disappear (intermediate; child is training to remember) vs. password locations are not displayed at all (hard; child is being tested as to whether or not he remembers)

b. when displayed, password locations are (easy)/are not (hard) numbered or the order between them is/is not otherwise marked e.g. next password location to be clicked upon blinks or is otherwise stressed, whereas other password locations do not blink.

c. Typically, feedback is provided in all stages; however feedback may be provided after each location is clicked (easy) or only after all locations have been clicked, rightly or wrongly (hard).

The first time a student logs in (using "picture login") the server may randomly pick a picture for the student. Each picture has a large list of predefined points of interest stored at the server, in the picture database. The server typically picks randomly a set of n e.g. 3 points and sets them as the student's first picture password.

The system typically keeps statistics of login attempts and/or logs of training sessions so teachers can track students who need attention e.g. who get alerts re violations of code of conduct e.g. when a student spams, or tries to take the identity of, a different student.

The system typically logs activity for both login methods (primary, secondary), typically storing the login times and shows usage statistics in various ways to help measure deployment and usage.

An example sequence of classroom login operations, some or all of which may be supported by certain embodiments, e.g. Password training through gamification and or request-help operations, is now described in detail with reference to FIG. 2. The system may provide the child end-user with incentives such as badges; however this is not shown for simplicity.

Step 1: The student (also termed herein "child") is shown a list of all children in his class and clicks on his name.

Step 2: The system's testing functionality shows the picture that is associated with the student and prompts the student to input his password (IE: click at the right places in the right order)

Step 3: Student requests assistance and the teacher comes the student indicates that he requests assistance e.g. by pressing on the help option on the screen. Responsively a modal popup may appear on the child's screen, requesting the Teacher Pin. Typically, the teacher gets her PIN together with her account information when she starts using the service. She can then modify her PIN if desired. After the teacher enters her PIN he or she gets access to the teacher options panel.

Step 4: Teacher selects an Option either for all end-users in her class or for an individual. Some or all of the following 3 options may be displayed on the screen at this point:

i. Approve the student's identity and enable the student to immediately proceed with his tasks. If the teacher is now physically standing by the student, she can identify him in person and approve his identity.

ii. Display/Modify the student's Password.

This option enables the teacher to see the student's password and modify it.

iii. Start a training session for the student whereby using "gamification" the system's e-learning functionality trains the student to remember and accurately enter his password.

Step 5: interact with the test configuring functionality to Modify Password, e.g. based on a display of an existing pictorial password The end-user child and/or her teacher can typically interact with the test configuring functionality by moving the password points (which may be marked e.g. using numbers—overlaying the picture) and/or by replacing the image, substituting e.g. another image in the picture database. Alternatively, there may be an option to upload personalized pictures.

Step 6: Password training game guided by the system's e-learning functionality that typically speaks/guides and encourages the student to learn the password. Levels may be defined e.g. including an initial level where all points (locations currently defining a particular child's password) are both marked and numbered. When the student clicks correctly, the system may give him visual feedback e.g. a smiley and/or audio feedback (Good Job). In a medium level the locations currently defining a particular child's password may be marked but not numbered.

The system's e-learning functionality typically explains to the child and measures success. The goal may be to reach a predefined success criterion e.g. 3 "clean" rounds in a row (clean=rounds without failures where all clicks/taps were in place and in the right order). After the criterion is achieved, the system moves to the next level.

During the Next Level the system may not mark locations constantly; instead the e-learning functionality may briefly mark the locations; but this hint disappears after a second.

The system typically continues to give visual and audio feedback to inform the child whether or not his selection of locations was correct and in order.

During the last level, the system may not even give hints to aid the child in selecting locations; instead the system's e-learning functionality may only give a posteriori feedback.

After the success criterion e.g. completing 3 "clean rounds" of successful password entry, has been achieved, the training session is terminated by the system's e-learning functionality; the system then switches to password entry mode which may be governed by the system's testing functionality.

In any level if the student fails during a password entry session the count toward "clean rounds" (say) typically re-starts from the beginning.

At any time during the session the student can typically stop the training by exiting/or changing the user.

At any time the student can typically request help and then the teacher can either approve his identity, modify his password or restart his training session.

Certain embodiments of the present invention include a system including all or any subset of the following:

a. a touch-triggered actor operative to perform actions;

b. a touch screen or other device for sensing user interaction e.g. by touch;

c. an oral presenter e.g. audio speaker presenting an oral characterization of actions performed by the actor. For example, "let's watch a movie about turtles" might be orally presented to characterize (in a matter meaningful to, e.g. from the viewpoint of, the non-literate user) the action of loading and playing a movie about turtles accessible to the touch-trigger actor e.g. from a digital content repository;

d. a digital oral presentation library including a plurality of oral presentations for playing to the end user by the oral presenter, each being associated in computer memory with a plurality of actions performable by the actor, respectively;

e. a rules database or digital repository storing, in computer memory, at least one rule by which at least one associated processor may control or govern the behavior of at least one of the oral presenter and the actor; any suitable technology may be employed to store this logic since techniques for computer-storage of logic and rules are well known.

An action may include a very wide variety of computer system operations such as but not limited to: setting a mode of operation for component/s of the computer system (e.g. in a computer system comprising a mail editor—action might set the mail editor's mode of operation by setting font size font to either small medium or large), opening a popup window, load and display additional information (which may be logically subsumed under a first icon corresponding to a button) e.g. load and play a movie or load and display buttons (the buttons' icons may be logically subsumed under the first icon, e.g. first icon—birds; subsequently displayed buttons—pelican, flamingo, crow, owl); Send email message, Create new folder, Print a drawing, request assistance from teacher, select which application to operate (e.g. email/word processor/search); Save a bookmark; Select the eraser tool in order to start erasing objects from a drawing; respond to a poll e.g. with an answer from a menu or list of answers. Actions may be implemented as a function having a pressed button object as a parameter which may for example determine what the action operates on. For example:

a. a button associated with a postage-stamp icon or symbol presented to the child end-user, may be associated with an action that opens a popup window displaying various postage stamps, one of which may be selected by a use.

b. a "Who should I write to" button may be associated with an action that opens a popup window with the address book.

c. In a children's computerized search engine which lets children virtually discover the world, each of various categories of information (animals, machines, countries, famous people) may be associated with a button to be pressed, which corresponds to the action of loading and displaying buttons corresponding to sub-categories of the original category. If the child selects "countries", the action might be loading and displaying buttons corresponding to the continents; if the child selects "North America" the action might be loading and displaying buttons corresponding to Canada, United States and Mexico, and so forth.

Touch UI that enables non readers to operate a button based system.

The term "button" as used herein is intended to include any object e.g. in the sense of object-oriented programming, that is presented to an end user of a computerized system e.g. has a visual presence on the screen. The term "button" as used herein may for example be a menu entry (or, say, a "Talking Label" which when tapped announces the text using voice—but may have no action associated therewith to be performed responsive to bing tapped) and is intended to include any graphical object such as but not limited to an Image or photograph, a geometric shape whether simple (e.g. rectangle/circle) or complex. A button may for example be implemented by using libraries such as JQuerey Mobile or Microsoft Silverlight or Microsoft Windows Presentation Foundation, e.g. by creating User Controls/Objects and tying the object's events; in some cases the raw event (e.g. TouchDownEvent, TouchEnterEvent, TouchLeaveEvent, TouchMoveEvent, TouchUpEvent, firm press AKA "3d touch") may be wrapped with a control that will delay the trigger of the "tap hold" command after a timer, triggered during a tap down event, expires.

With the above extension, some or all of the following data may be stored for each Button object: Link to symbol e.g. URL, Button text (example string), Link to Voice file (if Audio played from file—alternatively Text to speech library may be used to "speak" the text; Link to Action (e.g. linkt to function/method of object that performs the action for this button); Priority (e.g. int); Type (e.g. enum). Conventional state machine software tools may then be used, such as for example Microsoft's State Machine Workflows to build a state machine that implement desired rules e.g. any subset of or all of those shown and described herein, and to tie the events coming from the button objects to the machine as the machine events. The machine keeps the current button and with the event, gets as a parameter the object=button that generated the event.

FIGS. 5a-5b, taken together, form a simplified generally self-explanatory flowchart illustration of an example method for serving non-literate users, according to certain embodiments; some or all of the following operations may be performed, suitably ordered e.g. as follows:

Operation 5210: providing a touch screen defining a plurality of touch screen locations respectively corresponding to a plurality of selectable system-actions and operative to detect and distinguish between first and second gestures Operation 5220: providing an oral presentation library including a plurality of recorded oral presentations which when played to the end user by the oral presenter, orally characterize the plurality of actions respectively.

Operation 5230: providing a rules database storing at least one rule governing the behavior of at least one of the oral presenter and the actor, responsive to at least one sequence of end-user gestures including initial and subsequent end-user gestures; the rules database may store at least one premature-gesture-handling rule (e.g. for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B).

Operation 5240: providing a touch-triggered actor which, responsive to at least each first gesture applied by an end-user to an individual location within the touch screen, from among a plurality of touch screen locations, performs at least one individual action, from among the plurality of actions, which corresponds to the individual location.

Operation 5250: providing a touch-triggered oral presenter which, responsive to at least each second gesture applied by an end-user to an individual location within the touch screen, from among the plurality of touch screen locations, presents an oral characterization of the at least one individual action, from among the plurality of actions, which corresponds to the individual location. If the rules database stores a relevant premature-gesture-handling rule, the oral presenter's behavior may be governed by this rule e.g. responsive to situations in which (a) an end-user triggers a recorded oral presentation of an individual action A by applying a gesture to an individual location AA corresponding to action A and in which (b) subsequently, "prematurely" i.e. before the recorded oral presentation of individual action A has finished playing, the end-user applies a gesture to an individual location BB corresponding to action B.

Operation 5260: using touch screen and/or library and/or database and/or actor and/or oral presenter to interact with a pre-literate, non-literate or semi-literate end-user including providing oral information in a manner which well serves, and does not frustrate, the goals of the end-user e.g. child e.g. as described in detail herein. For example, suitable rule based logic may be employed to govern the system's behavior as appropriate given that a child may have pressed a button by accident, and/or to control the system to refrain from performing the same action over and over again although a child may have made a gesture corresponding to that action a number of times; instead the system might infer what the child really wants. For example, if the child's repeated gestures each are intended to invoke an oral presentation of an action, the system might infer after several such repetitions that what the child really wants is for the system to actually perform the action; the system would typically not orally present the action again and again and might instead simply perform the action. Many other examples of rules for serving rather than frustrating the goals of the non-literate end-user who e.g. as above may not be correctly using the user interface so as to correctly express and implement her or his goals, are described herein. Rules may be determined in a set-up stage in which a child's natural interaction with the system is observed and compared to the child's actual goals as expressed when debriefed by a human observer or as expressed in her or his subsequent behavior.

It is appreciated that certain actions, e.g. play a video or audio clip, may take a relatively long time to complete and rules may then be employed to best serve the child e.g. if the child performs various gestures while the clip is playing; the rules might determine whether to continue playing the clip or whether to interrupt or terminate the clip, depending e.g. on a predetermined priority of the action (e.g. "play clip") corresponding to the first of the child's gestures. If the action corresponding to the child's first gesture is deemed important, the system might continue playing the clip, whereas if the action corresponding to the child's first gesture is deemed unimportant, the system might interrupt or terminate playing the clip once the child makes her or his next gesture.

These rules are particularly important for audio actions. For example, the rules database may be used to store audio prioritizing rules which determine how to prioritize a first audio stimulus being presented to the child via an initial gesture (e.g. an audio clip or a brief oral characterization of an action) relative to a second audio stimulus that the child is now requesting via a subsequent gesture made while the first audio stimulus is still being presented. For example, the system is playing video including sound and rule/s in the rules data repository (database) may be used to determine whether or not, responsive to tapping or tapholding during the video, the system should "speak" (orally present) a just-tapped button.

For example, the system may comprise (embodiment 1) a touch-triggered actor which, responsive to each, or at least each, first gesture applied by an end-user to an individual location within the touch screen, from among a plurality of touch screen locations, performs a specific action, from among the plurality of actions, which corresponds to the individual location; and a touch-triggered oral presenter which, responsive to each, or at least each, second gesture applied by an end-user to an individual location within the touch screen, from among the plurality of touch screen locations, presents an oral characterization of the specific action, from among the plurality of actions, which corresponds to the individual location.

It is appreciated that there need not be a one-to-one correspondence between actions and locations; the same action may be invoked for 2 different locations for example. Similarly, there need not be a one-to-one correspondence between actions and gestures; more than one action might be performed responsive to a single gesture and/or several gestures might correspond to a single action.

According to certain embodiments, the child typically applies a gesture to one of, thereby choosing between, a plurality of locations, bearing icons reminiscent of email, search engine, and spreadsheet functionality respectively. The child's gesture may trigger the actor to cause the system to change into email mode, search engine mode, and spreadsheet mode, respectively. Oral characterizations of each of these mode-changing actions may for example be "email" "let's find out" and "let's work it all out", respectively.

To give another example, once the system is in search mode, the child typically applies a gesture to one of, thereby choosing between, a plurality of locations, thereby to cause the actor to present one of a plurality of information repositories. For example, a gesture applied to one location, bearing an elephant icon, may trigger the actor to present information about animals, whereas the same gesture applied to another location, bearing a daisy icon, may trigger the actor to present information about flowers. Oral characterizations of each of these information presentation actions may for example be "Tell me about animals", "tell me about flowers", etc.

To give another example, once the system is in the animal-sub-mode of a search mode, several icons (touch screen locations) may be provided such as "what does it eat?" "what does it look like?" "what does it sound like?". Responsive to the first and third, suitable audio information may be played, responsive to the second, a suitable video clip may be played, and so forth.

A particular advantage of certain embodiments, is that a non-literate child can graduate easily from the system according to certain embodiments, to a conventional computerized system intended for use by literate end-users. For example, a non-literate version of a conventional computerized system intended for use by literate end-users may be developed by using the gesture which triggers actions in the "literate" version of the system used as the first gesture in the "non-literate" version of the system. Therefore, when the child graduates from the "non-literate" to the conventional, "literate" version, the child easily adapts, since the first gesture continues to trigger the same actions when applied to suitable respective locations, hence the difference between the non-literate and literate version may merely be whether or not there is an option of applying the second gesture so as to obtain oral presentations of actions.

Another advantage of certain embodiments, is that an "audio tool-tip" may be provided. A non-literate child can be presented with audio descriptions of action options, even though the input device mode—touch—does not facilitate this, since contrary to other input device modes, there may be no hovering capacity e.g. no mouse-in or mouse-out events to inform the system of what screen location the end-user might be about to select.

Another advantage of certain embodiments, is that a child can explore various touch screen locations e.g. "buttons", each of which, if selected, results in a particular action being performed by the touch-triggered actor at the child's behest, despite the fact that (a) the child is using a touch screen with all the disadvantages that entail relative to a mouse; and/or (b) the child is pre-literate and/or (c) the child is working independently with no guidance from a literate supervisor. In many conventional computer systems, no user-interface technology is provided that might enable the pre-literate child to learn usage by experience/trial and error; instead the assumption is that a literate supervisor (or software equivalent) is present; s/he normally would simply direct the child to perform a supervisor-imposed sequence of operations that are "right". It is appreciated that the actions performed by the touch-triggered actor e.g. at the child's behest, may include any system action, data-driven or otherwise, which the system/actor is configured e.g. programmed to perform, including, but of course not limited to, the system action of presenting e.g. displaying certain information; or the system action of setting or changing an operational mode (e.g. insert mode vs. override mode) within which the system is operating. For example, certain embodiments shown and described herein enable a non-literate child using a touch-screen to independently, with no literate supervision whatsoever, browse between icons pictorially representing categories of information, and to encounter information in any of those categories, once the system presents same responsive to the child's selection of any of the icons. The icons need not perfectly represent the respective categories of information since the icon's representation of the categories may be augmented by an oral presentation of the information "residing below" a particular icon.

The applicability of certain embodiments is not limited to pure touch applications; and instead includes use-cases where both mouse and touch interactions with the end-user are possible.

The applicability of certain embodiments includes use-cases in which hierarchies of system actions are provided i.e. certain actions become options only after other actions (such as "display menu") have previously been selected and performed.

It is appreciated that any suitable touch screen may be employed, e.g. any display for computer-generated or stored data that is also an input device, such as a screen or other display that is sensitive to pressure; or such as any system which senses a user interacting therewith by touching pictures or words or other locations on or in a display. The touch screen may for example be based on resistive, surface wave or capacitive technology. It is appreciated that the touch screen may include a virtual touch screen (VTS) e.g. a user interface system that augments virtual objects into reality e.g. via a projector or optical display, and may use sensors to track a user's visual and/or physical interaction with projected virtual object/s.

Referring again e.g. to embodiment 1, it is appreciated that many variations on this embodiment are possible, such as but not limited to:

Embodiment 2

A system according to any preceding embodiment and also comprising an oral presentation library including a plurality of recorded oral presentations in a computer-implemented memory which, when played to the end user by the oral presenter, orally characterize the plurality of actions respectively.

Embodiment 3

A system according to any preceding embodiment wherein the oral presenter also presents an oral characterization of the individual action, from among the plurality of actions, which corresponds to the individual location, responsive to each first gesture applied by an end-user to the individual location within the touch screen.

Embodiment 4

A system according to any preceding embodiment and also comprising a rules database storing, in a computer-implemented memory, at least one rule governing the behavior of at least one of the oral presenter and the actor, responsive to at least one sequence of end-user gestures including initial and subsequent end-user gestures.

Embodiment 5

A system according to any preceding embodiment wherein the rules database stores at least one premature-gesture-handling rule governing the oral presenter's behavior responsive to situations in which an end-user triggers a recorded oral presentation of an individual action A by applying a gesture to an individual location AA corresponding to action A and subsequently, "prematurely" i.e. before the recorded oral presentation of individual action A has finished playing, the end-user applies a gesture to an individual location BB corresponding to action B.

Figure 7:
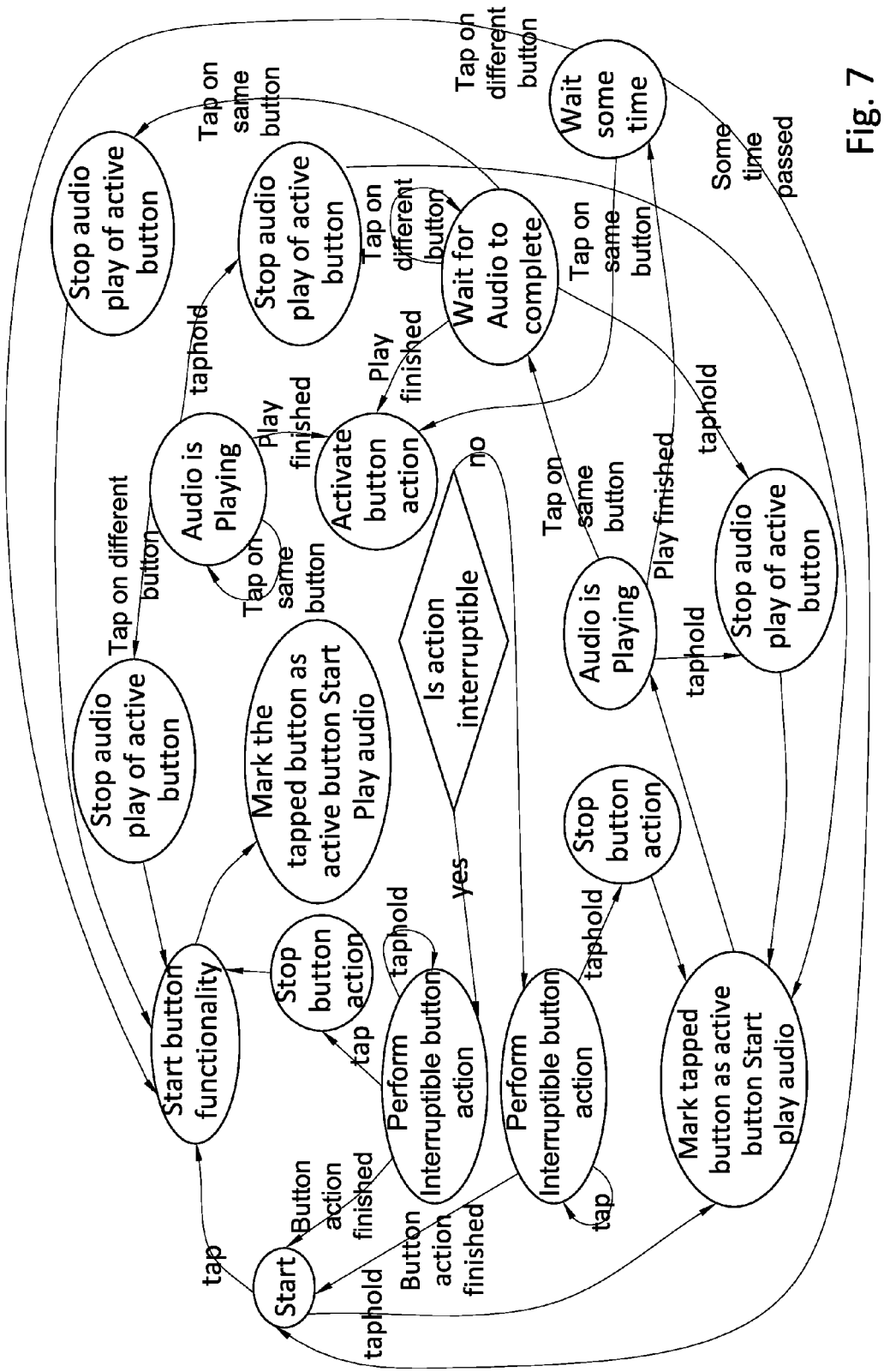
FIG. 7 is a simplified state chart representing logical rules, some or all of which may be provided in accordance with an embodiment of the present invention.

Example rules, all or any subset of which may be provided, are shown in the state chart of FIG. 7.

Embodiment 6

A system according to any preceding embodiment wherein least one premature-gesture-handling rule is operative for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B.

For example, the following rule may be used by the system: If only a few seconds have elapsed between 2 taps on the same button, the system may assume that the child, having heard the oral presentation of Action A responsive to her first tap, now wants to perform Action A (e.g. to play a video clip). Therefore, responsive to the second tap, the system actor performs Action A and, as opposed to when responding to the first tap, the oral presenter does not re-present Action A orally. In contrast, if more than a few seconds elapse between the same 2 taps, the system may no longer assume that the child wants to select Action A, and therefore, the oral presenter presents Action A twice, once responsive to the first tap and again responsive to the second tap.

Embodiment 7

A system according to any preceding embodiment wherein the rules database stores at least one immediately-subsequent-gesture-handling rule governing the behavior, of at least one of the oral presenter and the actor, responsive to situations in which an end-user applies a subsequent gesture "immediately" after i.e. within a predetermined time window after an initial gesture.

Embodiment 8

A system according to any preceding embodiment and wherein the actions are each assigned one of at least 2 levels of priority and wherein the rules database stores rules governing behavior of at least one of the oral presenter and the actor responsive to at least one sequence of end-user gestures including initial and subsequent end-user gestures and wherein one of the rules is selected for application depending at least partly on a level of priority of the action corresponding to the initial end-user gesture.

For example, actions may each be assigned a level of priority such as some or all of the following: interruptible, non-interruptible, non-abortable.
For example:
a. if the user used a brief tap to activate a video clip and is defined as "non-interruptible", and the user now tap-holds another button on the touch screen while the video clip is still playing, the video clip will not be interrupted; instead the tap-hold action will be ignored. In contrast, if the video clip is deemed lower priority, and is hence defined as "interruptible, the subsequent tap-hold action will be responded to.

According to certain embodiments, video clips presented to the user pursuant to a user's search for results are deemed non-interruptible by tap-holds and interruptible by brief taps. Therefore, if a user tap-holds while a previously selected video clip is still playing, the system will not respond. However, if the user brief-taps while the previously selected video clip is still playing, the video clip will abort and the system will respond to the brief tap.

b. If the user initiated a search and at least one search result was presented to her or him, the system may subsequently ask the user whether or not the search results were what s/he was looking for. The state of waiting for the user's response to this typically orally presented question, may be defined as non-abortable hence high priority, in which case all subsequent user actions may be ignored until the user responds to the query.

Embodiment 9

A system according to any preceding embodiment wherein the first gesture comprises a brief tap.

Embodiment 10

A system according to any preceding embodiment wherein the second gesture comprises a tap-hold.

It is appreciated that tap and tap-hold are but examples of conventional gestures e.g. in JQuerey Mobile which is but one possible library that may be used for implementing the underlying infrastructure including using the JQuerey (or other library's) events to trigger the state machine of the button.

Any other pair of gestures may replace the tap and tap hold gestures/events described herein. According to certain embodiments, a child version of a conventional application may use the same gestures as the conventional (adult-oriented) application for some or all Actions and another gesture may be defined to elicit the voice tooltip for that action, thereby to render the child-oriented version of the application both "compatible" to the conventional adult version and intuitive.

Alternatively, then, the roles might be reversed (first gesture—tap-hold; second gesture—brief tap); or the first or second gestures might be any other suitable gesture such as but not limited to pinch, press and tap, flick, swipe, spread, double-tap, rotate, or directional or other variations on the same type of gesture e.g. the first/second gestures might be an upward/downward flick respectively, or vice versa.

In certain embodiments, when an end-user tap-holds a location corresponding to action x, the system plays a recording describing action x but does not perform action x. When the end-user briefly taps the location corresponding to action x, the system (optionally plays the recording describing action x and also) performs action x.

Embodiment 11

A system according to any preceding embodiment and also comprising a touch screen operative to detect, and distinguish between, the first and second gestures.

Embodiment 12

A system according to any preceding embodiment and also comprising a tablet having a touch screen operative to detect, and distinguish between, the first and second gestures.

Embodiment 13

A system according to any preceding embodiment wherein the levels of priority determine whether or not an action of at least one of the oral presenter and the actor, initiated responsive to the initial end-user gesture, is interruptible if the action interferes with another action which is to be initiated responsive to the subsequent end-user gesture. For example, if a video clip, located "below" a particular touch location or button, is in the middle of playing (first action) and another video clip is to be played responsive to a subsequent gesture the child has made, these 2 actions interfere with one another because the already playing video makes it impractical to simultaneously play a new video since the child cannot hear both. Therefore, if the priority of the first action is "interruptible", the actor may interrupt or terminate playing the first video and may initiate playing of the second video.

Other embodiments, implementations and variations are now described. Suitable rules may be stored e.g. in the rules database/repository to ensure desired talking-button behaviors, responsive to user gesture patterns such as gestures (applied to same or different touch screen locations) immediately following one another e.g. within a predetermined time window and/or while an audio message triggered by a previous gesture, is still playing.

For example, some or all of the following "immediately—subsequent-gesture handling" rules or rule components may be provided:

a. Normally, if button1 is brief-tapped, its audio is played and subsequently, its action is activated.

However, if responsive to brief-tapping, the Audio of a button1 is being played and has not finished playing when a new brief-tap, on Button2, is sensed—the Playing audio of button1 may be stopped and button1's action may not be activated instead, Button2 functionality starts.

b. if button1's activity is defined as interruptible and Button1's activity has still not terminated when a new brief-tap, on Button2, is sensed—button1's activity is stopped and then Button 2's functionality starts.
If this button audio is being played ignore tap c. talking button1's oral presenter plays the Audio of button1 responsive to a gestures sensed by button1—unless the same audio was played recently (parameter)). when the play finishes (if played i.e. if the audio has not been played recently), button1's actor activates the action corresponding to the button—also termed the "button activity"

d. when TapHold is sensed by button1, If another button, button2, has an active (not yet finished) button activity, ignore taphold e. if an Audio of button1 (this or other) is being played and did not finish play until a tap is sensed on button2 (or until an additional tap is sensed on button1), the Playing audio of button1 is stopped. Instead, Talking button2's oral presenter plays its Audio.

FIG. 6 is a simplified flowchart illustration of an example method of operation, using touch screen logic provided according to certain embodiments; some or all of the following operations may be performed, suitably ordered e.g. as shown:

step 6310: if an initial gesture is sensed at button A (e.g. of FIG. 8), oral presenter begins orally characterizing button A (5 sec sound file/text/image/all may be data driven externally)

step 6320: if a subsequent gesture is sensed by button B while the oral characterization of button A is still playing, oral presenter aborts oral characterization of button A and begins orally characterizing button B step 6330: if the initial gesture was a brief tap, begin performing the action corresponding to button A if the oral characterization of the button A terminates without interruption. If gesture was tap-hold, do not perform the action corresponding to button A step 6340: return to wait mode, go to step 6310 when next gesture is sensed.

Certain embodiments seek to provide smooth and intuitive operation also on machines that support concurrent touch and mouse interactions with end-users.

The Talking button may have 2 modes (mouse, touch e.g.) of responding to users. For example, Button Audio may be activated by alternate methods including, for example, mouse hover.

It is appreciated that certain embodiments of the invention are suitable for designing a Touch user interface or other user-responsive device that enables non readers to operate any suitable computerized system such as, but not limited to, a button based system, as in the above example, or a menu-driven system.

A Rule database may be represented as a state machine e.g. as illustrated in self-explanatory FIG. 7 which is a diagram of an example state machine; obviously some or all of the states shown may be provided; and transitions from state to state may be "mixed and matched" to generate rule patterns other than those specifically illustrated in FIG. 7 or elsewhere herein.

Figure 8:
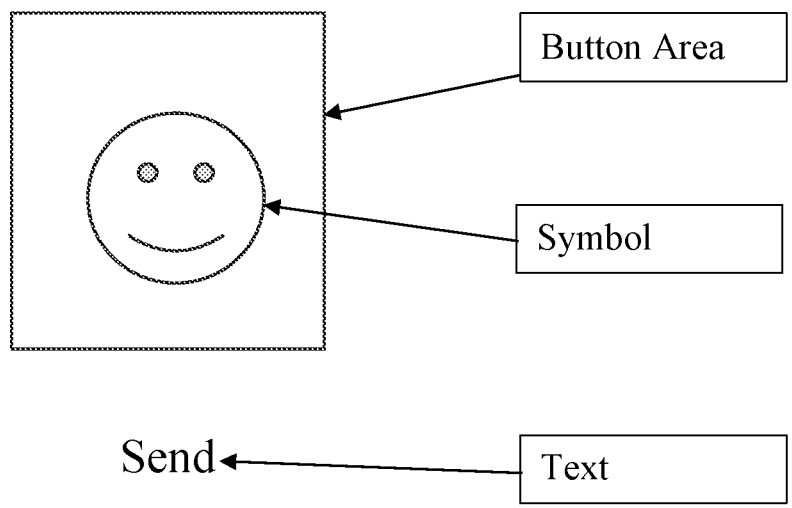
FIG. 8 is a simplified pictorial representation useful in appreciating an embodiment of the present invention.

According to certain embodiments, "Talking buttons" are deployed on a touch screen; these may operate together. FIG. 8 is a simplified pictorial illustration of a talking button according to certain embodiments.

Each talking button may include some or all of the following components or objects:

a. ButtonArea—An Area e.g. touch screen location that responds to e.g. senses end-user gestures such as but not limited to any or all of: Click/Tap/Mouse over (in and out) events b. Symbol—e.g. an icon, such as the Smiley in FIG. 8, that usually appears inside the button area.

c. Actor/Action—the action, if any, which is performed or activated when the button is selected using a predetermined gesture sensed by the button area e.g. the button area may be briefly tapped or played. For a "talking label" there may be no action (or null action).

d. Text—text visually displayed (e.g. for semi-literate children) adjacent the button Area that describes the action which will be performed or activated when the button is tapped or played e.g. using a predetermined gesture sensed by the button area e. oral presenter/Audio—a Sound e.g. voice message that is played in order to describe or orally characterize the action (c.) e.g. responsive to a predetermined gesture which differs from the gesture that triggers action c.—such as tap-hold A Talking button may have a tooltip.

A Talking button may have a disabled indication. For example: a "Coming soon" note may appear on a disabled button.

f. IsTalkingLabel—an indication that the button is a talking Label May have a graphical appearance that suggests to the end-user that the label "talks" e.g. an underline mark, or Font or symbol that appears near e.g. under the label, which is possessed only by talking labels.

According to certain embodiments, a secure social networking system suitable for preschool children is provided, including some or all of:

a. a teacher user-interface operative to allow each of a plurality of teacher-users, pre-defined by a trusted authority, to define a class including a plurality of pupils including defining, for each pupil in the plurality of pupils, a pupil's contact information; and at least one parent having parent contact information.

b. a parent user-interface operative to allow each individual parent whose association with a given pupil and a given class is defined by said teacher user-interface, to define pupils belonging to classes other than said given class with whom the individual parent authorizes his child (said given pupil) to communicate; and c. a child user-interface operative to allow each individual pupil within an individual class defined by an individual teacher, to communicate with all pupils within the individual pupil's class as defined by the teacher user-interface and also to conduct communication with at least one specific pupil, who belongs to a specific class other than the individual class, this specific class having been defined by a specific teacher other than the individual teacher, wherein said communication is only authorized if the individual pupil's parents, defined by the individual teacher using the teacher user-interface, and also the specific pupil's parents, defined by the specific teacher using the teacher user-interface, have both authorized said communication, thereby to define the individual pupil and the specific pupil as an authorized pair of communicants.

Functionality may be provided for preventing teachers from accessing the parent and child user interfaces. Teacher credentials, once entered by an end-user, assign to the end-user a teacher role. When a parent logs into the system, he typically uses his child credentials that have a student role. The parent is typically required to add a parent pin—to prove that he is the parent of the child. At that point, the system typically grants editing access to the child's private address book, to that parent. The child himself typically has read only access to his address book. Typically, teacher credentials have a single link to a single class address book and can access only that address book.

Functionality may be provided for preventing children from accessing the teacher and parent user interfaces; each teacher and each parent has their own PIN, which is intended to be a secret from the teacher's/parent's child/ren.

Functionality may be provided for preventing parents from accessing the teacher user interface. Typically, parents and teachers can access a child's UI but a teacher cannot access a parent UI (user interface).

So for example, the system may be configured to allow each child to receive communication ("email" e.g.) from his teacher and staff of his kindergarten or class, his classmates and his parents, but not from unauthorized persons not in his class, since the system typically checks for each communication e.g. email, that sender and recipient are from same class or appear in each other's Private address book. In order for someone who is not a user (who is an external recipient e.g.) of the system, e.g. parent or grandmother, to send an mail to a child, this is typically only possible if Grandma first received an mail from the child; this email or communication includes a "reply link"—URL which contains a global Unique ID unique to the child. The external recipient can then surf to the reply link URL, at which point the system prompts the external recipient to provide her or his destination/contact information via an external network e.g. the external recipient's SMTP email address. Then, before the "email" including content keyed in by the external recipient, is delivered to the child, the system checks to verify that the external recipient's destination/contact/email address indeed appears in the private address book of the student whose GUID is part of the URL.

Typically the system is pre-configured such that no communication is possible other than communication between authorized pairs of communicants. Authorized pairs of communicants include any pair of pupils of a single teacher and/or any pupil and her/his teacher; and/or any pupil and her/his parent.

Typically, the parent user-interface is operative:

to allow each individual parent whose association with a given pupil and a given class is defined by said teacher user-interface, to send requests, through the system, to parents of pupils belonging to classes other than said given class asking those parents to authorize their children respectively to communicate with the given pupil; and/or to allow each particular parent who has received an individual request sent by the individual parent, to approve the individual request, thereby to define the individual parent's child (said given pupil) and the particular parent's child as an authorized pair of communicants.

According to certain embodiments, a server-mediated internal communication system is provided, supporting communication among registered teacher-users pre-defined as authorized pairs of communicants.

A server may also provide introduction functionality, operative to:

receive, from each teacher, externally provided contact information that the parents previously provided to the teacher; store the externally provided contact information; and facilitate the teacher's transmission of introductory messages to each parent in the teacher's class, using said externally provided contact information, wherein the introductory message sent to each specific parent typically assigns to the specific parent a user name and password, granting that specific parent access to said parent-user interface.

Each communicant's contact information may comprise an email address, cell phone number, or any other unique designation of a destination for electronic content.

The system may also include some or all of:

a. a teacher database including a teacher data record for each teacher in a supported teacher population and wherein each teacher data record is operative for storing a teacher's contact information;

b. a pupil database including a pupil data record for each pupil in a supported pupil population and wherein each pupil data record is operative for storing a pupil's contact information and an association between the pupil and an individual teacher in the supported teacher population; and c. a parental database including a parent data record for each parent in a supported parent population and wherein each parent data record is operative for storing a parent's contact information and an association between the parent and an individual pupil in the supported pupil population.

If an individual parent is known by the server to be logged in to the system, the individual parent is typically brought straight to a web-page within the parent user interface which enables the individual parent to authorize contact with whichsoever pupils whose parents have requested contact with the individual parent's child. If an individual parent is deemed by the server not to be logged in to the system, the parent is typically routed first to a login page of the parent user interface login page and only subsequently, straight to a web-page within the parent user interface which enables the individual parent to authorize contact with whichsoever children whose parents have requested contact with the individual parent's child.

According to certain embodiments, a secure social networking system for pupils including a mail server is operative to:

a. communicate with external recipients via a gateway to at least one external communication network serving the external recipients; and/or b. communicate with at least one internal recipient including pupil end-users, thereby to define an internal secured network.

Computer memory accessible by the server is operative to store associations between individual parents who are nodes in the at least one external communication network and individual internal recipients from among the pupil end-users; and/or white-lists of authorized communicants for individual pupil end-users, provided by the server.

Typically, the server is operative to interface with:

a secured parent environment including a parent's user-interface operative to allow each of said individual parents whose association with a given pupil from among the pupil end-users is stored in said memory, to authenticate himself and subsequently to define for the server, a white-list of pupils with whom the individual parent authorizes his child (said given pupil) to communicate; and/or a secured pupil environment including a pupil's user-interface operative to allow each first pupil to communicate via said server with any pupils appearing on the whitelist of internal recipients stored in the memory for the first pupil. According to certain embodiments, for communication to be authorized, the communicants must not appear on the black list of any pupil in the pupil pair, Typically, for at least one first and at least one second pupil end-user from among the pupil end-users, the server's logic is configured such that the whitelist provided to the memory for the first pupil end-user includes the second pupil if and only if the first and second pupils' parents, as defined by said associations, have both, via their respective parent's user-interface, authorized communication between the first and second pupils, thereby to define the first and second pupils as an authorized pair of communicants.

Any suitable technology may be employed to implement the above systems.

For example, the technology may include a server e.g. mail server, and an associated gateway typically allowing outgoing communication typically with external network/s via their respective mail servers. Typically the gateway of the system does not allow incoming communication, thereby to generate an internal network secured from incoming communication from external networks.

An identity manager may be associated with the server and may control access of various users e.g. depending on their roles as described herein and subject to their providing authentication e.g. as described herein. Any suitable conventional identity manager access control functionalities may be provided.

The term "server" as used herein includes a mail server and associated gateway e.g. one-way gateway, and associated identity manager.

Each child served by the mail server may be assigned his or her own unique GUID.

According to certain embodiments, each email or other communication sent by the mail server to an external recipient on behalf of a child/student includes a link to a website associated with the server; the link may include a conventional http request requesting a page from the website and the GUID of the child sender may be supplied by the link as a parameter for that page. This link, if stored by a recipient of an email/communication from the child via the mail server of the system e.g. in the recipient's "favorites", enables the recipient to send a communication to the child; however, typically, the recipient is prompted to enter her or his email address so that the system can check that that email address appears on the white list defined for the specific child sender.

More generally, external recipients can typically send a communication to a specific internal recipient if and only if the external recipient can provide the GUID of the internal recipient and the external recipient is whitelisted for that specific internal recipient.

Typically, external recipients cannot reply to communications from an internal recipient; if they attempt to select the "reply button" in their email program, they typically encounter a noreply email address. However, the communication e.g. email sent to the external recipients typically includes a link as above and/or a "click here to reply to this child" button, both typically leading the external recipient to the same appropriate web page as described above.

According to certain embodiments, the message sent by the child to the external recipient is represented suitably e.g. as an image and or voice or video recording in any suitable format such as jpeg or png, mp3 or mp4 since the content the child composes may include non-text e.g. graphic or sound elements. The child's user interface typically facilitates not only composition of text messages but also graphic composition, using any suitable interface.

According to certain embodiments, the system supports parents inviting one another to whitelist their respective children as an authorized pair of communicants. However, optionally, the system may support this only if the parent receiving such an invitation has opted to receive such invitations.

Typically, the system sends an invitation from one parent to another only if the first parent provides (a) an email address which is recognized by the system as a parental email address; and/or (b) the name of the child is recognized by the system as being the son or daughter of the parent associated with the email address provided. The system may be configured to inform the first parent, if the email address and/or child-name he provides, is not recognized by the system.

The terms internal recipient, pupil, student, student user, and child may be interchanged without departing from the scope of the present invention.

Figure 9:
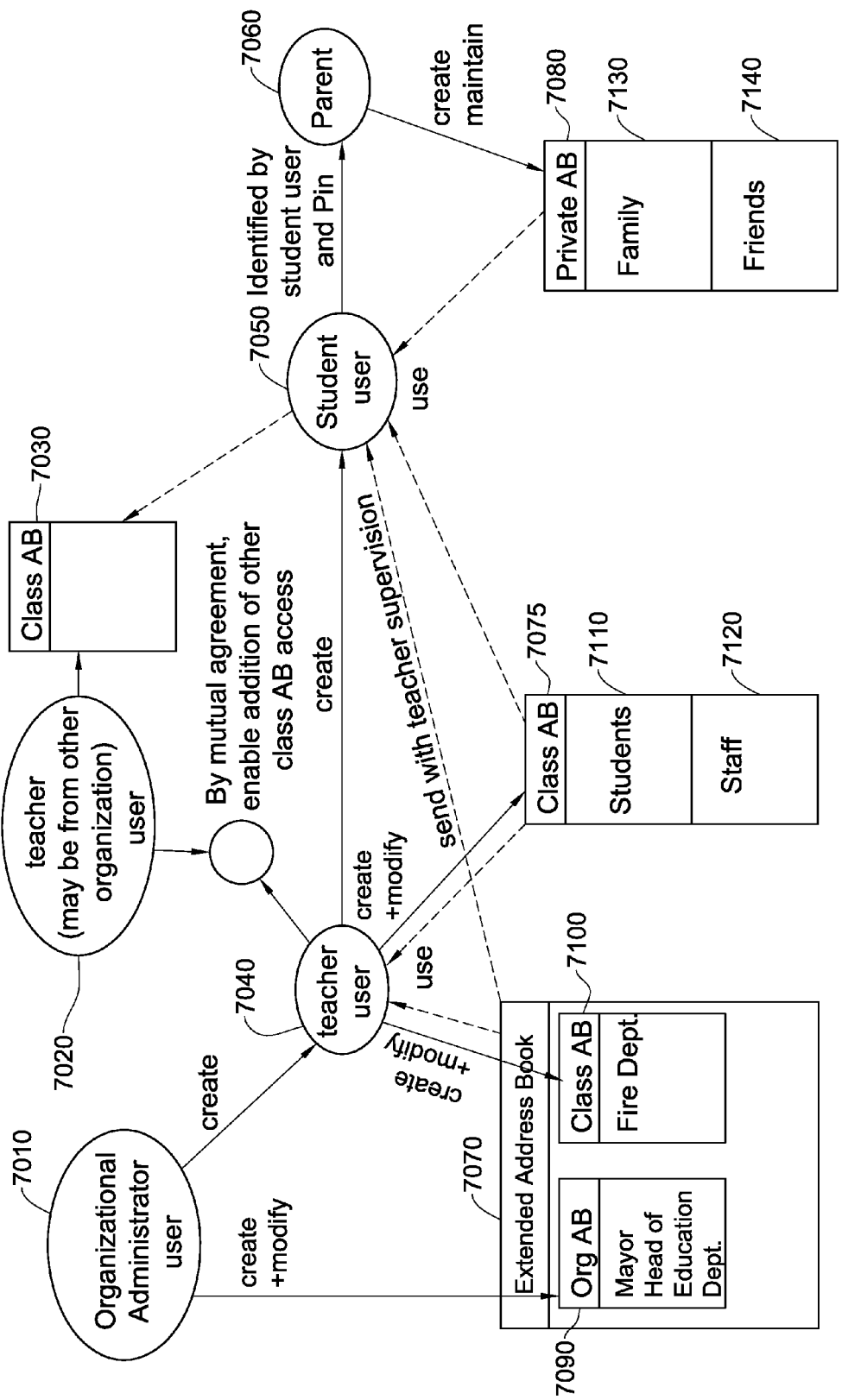
FIG. 9 is an example scheme for supporting secured communication to and from child-users in accordance with certain embodiments of the present invention.

FIG. 9 is an example scheme for supporting secured communication to and from child-users in accordance with certain embodiments of the present invention.

Typically, the system recognizes teacher credentials as having a role of teacher. Typically, when a parent logs into the system, he uses his child's credentials that are recognized by the system as having a role of student. The parent is then typically prompted to add a parent pin establishing that he is the parent of the child. At that point due to the combination of circumstances: role of student+parent pin detected—the parent gets access to the child's private address book (aka "AB").

Typically, teacher credentials have a single link to a single class and therefore can access only their class's data.

Typically, each teacher and each parent are assigned a PIN which they are expected not to share with the child.

Design considerations for the Address Book functionality, some or all of which may be employed, e.g. in conjunction with the embodiment of FIG. 9 and/or of FIG. 10, are now described.

According to certain embodiments, the address book for young children may include a list of addresses or other destinations facilitating communication between a child and others, the list typically including some or all of the following list portions:

The first list portion comprises classmates from the child's own kindergarten; these are typically internal recipients from the system's point of view, the second list portion comprises family members, who are external recipients, and the third list portion comprises friends e.g. neighbors or children of friends of the parents, who are not in the same class; these may be either internal or external.

In order to maintain the children's safety, only approved adults e.g. those approved by the teacher as being the child's parents, are able to modify the list of people a child can communicate with.

The first list portion (all children of the class) may be created by the class teacher or other trusted authority; typically only such a trusted user has authorization to create and modify this list. In order to access this class student list, an approved teacher (say) logs-in; personnel e.g. teachers may get credentials for "owning" a class hence modifying its address book e.g. via a username/password pair given to the teacher when s/he is granted access to the service. This list of students typically serves as the address book of the class. At this stage the teacher typically has an option to add, to each child's address book, a list of email addresses of approved adults (responsible adults) e.g. parents that are granted permission to maintain other list portions of correspondents with their child e.g. friends and relatives.

The system may empower the teacher to add to his or her class list aka "The class address book", an additional list portion of non-teacher assisting staff.

According to certain embodiments, the teacher and/or trusted authority can maintain a third list of external recipients aka the "extended address book of the class", that the students can communicate with, e.g. email address or other destination of the fire department or the museum that the class visited last week. When a child sends a letter to a recipient in this list the teacher is typically required to approve the letter prior to it being sent. This list may include an organizational list of recipients maintained by an "organization owner/organization administrator" aka "trusted authority" e.g. Head of Education Department. When people in this list reply to email, the system is typically configured to route the reply to the teacher (on behalf of the children) and the teacher has an option to forward the reply to the students.

According to certain embodiments, an automatic system process, typically teacher-activated, automatically creates users and assigns usernames and passwords to each child (and staff member) in the class address book. To the extent that responsible adults emails have been added e.g. in association with certain children in the class, the system sends mails to the responsible adults with the user name and password for their child and a PIN for the adult (which could be the adult's email address or other destination) and instructions on how to use the system e.g. responsible adults may be requested to assist their child during the first time they login to the system. In case responsible adults' emails were not added, the system may automatically prepare notes for the teacher to print per child, with username password and instructions, for hand-delivery to the responsible adults.

This process creates a user per student and typically enables students to login from home and use the system. Each student typically has his own identity—getting access to some or all of his mail, his private storage, his address book, his class resources and to the system.

Typically, the first time a child logs in from home his the system checks if a responsible adult's email was assigned, and if not, it enables the responsible adult to enter it at this stage. This enables the responsible adults to enter their emails when not entered by the teacher. After logging in from home, responsible adults are typically able to maintain the child's "private address book".

Typically, in order to access the child's private address book, responsible adults need to key in a pin (not known to the child) to prevent children controlling the maintenance of their private address book and hence maintain decision-making as to who is in the "white list" of people that the child can communicate with, in the hands of the parent—thus maintaining child safety and security.

A child's private address book may be presented to her or him as several lists: e.g.: family members and separately, friends, my classmates, staff members of my class, and so forth.

According to certain embodiments, internal and external recipients may be defined in the system and the definition may for example be as follows:

Internal recipient—an end-user e.g. child, teacher, staff member that receives his mail or other communication inside the system e.g. via the system's email server; and External recipient—receives mail outside the system (using SMTP). To maintain safety and security, the system typically includes a one-way gateway which sends mail to SMTP recipients but does not receive incoming mail from SMTP at all, or alternatively, does not receive same other than as described below. When an external recipient receives mail (from an internal recipient) the mail or other communication typically includes a system-added link that typically includes a GUID (Global Unique ID of the sending internal recipient; typically each child-user is assigned a unique GUID). This enables the external recipient to reply to a mail e.g. as follows: When an external recipient clicks on the link, a respond-to-communication functionality of the system is activated which typically requests the external recipient to enter his email. This email is then compared with the GUID that identifies the student to verify that the external recipient appears in the private address book of the intended internal recipient. Only external recipients who are listed at the private address book of a child are able to send mail to the child. Since it is practically impossible to guess pairs of GUID/email addresses, this serves as an effective safety net for incoming mail.

When adding a recipient to a child's private address book, responsible adults may be prompted to indicate whether the recipient is an internal or external (SMTP) user. For internal recipients there may be a special secure white-listing process, e.g. as shown herein in FIG. 10, that requires mutual agreement of the responsible adults of both sides.

There may be two types of students (child end-users) in the system:

1. Student of a class; regarding this type, according to certain embodiments:

a. Two teachers can mutually agree to connect their classes in which case each student has access to two class address books (his organic class and the "other class"); and/or b. The class address books may include "special entries" for sending to an alias for example—"All members of the address book" or a group of students that the teacher creates and typically names (e.g. "The Flower group") to teach virtual collaboration using at least one of shared storage, shared access and collaborative sessions in which students work in Groups.

2. Private home user. This is a student that has a private user account rather than having been enrolled as part of a class; he therefore has no class address book and no organizational address book, and has only a private address book.

Typically, the system supports creation of an internal recipient—private address book entries, for example when there are two friends that are members of two separate classes and wish to communicate with each other. Another case is where one of the children is a private home user, or where one child is a user of the system and he wishes to "invite" a friend to use the system and communicate with him. In this case, the system typically requires the children's responsible adults to be involved in the process of approving and creating the address book entries for their children.

A secure process e.g. that of FIG. 10 may be employed to enable two responsible adults to identify themselves (e.g. by receiving specific information in email, by logging into the system using their children credentials and their secret pin to get access and approve the connection). The process may then securely enable two responsible adults (an initiator responsible adult and an approver responsible adult) to link their children into an authorized pair (mutually whitelisted). When one of the responsible adults deletes an internal connection between children (blacklists a child) the connection is erased from both sides and the two children, as an authorized pair, no longer exist in the system.

FIG. 10 is a simplified flowchart illustration of an example method allowing parents to define their respective children as a pair of authorized communicants; responsively the server typically adds the first child to the second child's whitelist and vice versa. In the example, Sara wants to introduce her son Lior to Ehud, the son of Neal. The method may include some or all of the following, suitably ordered e.g. as shown:

a. the Email addresses of Neal (Father of Ehud) and Sara have been entered to the system and associated with the respective children by an authenticated person with the proper role, prior to the start of this method.

b. Sara Invites Neal (father of Ehud). Sara identifies Neal by the combination of Ehud's name and Neal's email. The system tries to identify the child by the father's email address and the child's first name (the exact matching criterion may be suitably defined e.g. the first x letters (prefix) need to match).

c. If the child was not found, the system lets Sara know that Ehud, son of Neal, is not registered to the system and gives Sara at least one of the following two options: 1. An opportunity to modify the request if Sara believes Ehud is registered but she has erroneously given wrong particulars; and/or 2. An opportunity to invite Neal to join/register with the service.

d. If option #2 was selected by Sara, the system sends a proposition mail to the email of Neal (father of Ehud) the email including the name of Ehud and a link to the registration site, including a special GUID that connects to this request.

e. If the system succeeded in identifying the child (Ehud), the system sends mail to Neal (father of Ehud) with an invitation. The system may create an invitation in Ehud's address book (the parental part). The invitation may include some or all of: Neal's email address; Sara's email address; the identity of the two children; Ehud's name—if this is a proposition to join; and/or free text that Sara is prompted to add to the invitation d. Neal accepts the invitation; Neal registers Ehud and creates a new student.

e. Neal enters the parental part of the new student's address book and looks at the place that displays the awaiting invitations. All pending invitations are displayed. The parent selects the relevant invitation to this child.

f. a prefix (at least) of the child name is compared to the name on the invitation. If these match, the invitation may be updated and may contain the identity of new student in the system.

g. The parent approves the invitation. Entries are created in an address book that connects the two children h. The inviting parent receives a mail that his invitation has been approved.

Any suitable login subsystem may be provided, e.g. to serve the systems of FIG. 9 and/or FIG. 10 or any other embodiment described herein. The login subsystem may for example use a suitable technology such as signed cookies (created e.g. on the server) to enable the system to support a single sign on between the various functionalities and/or sites that provide the service.

The system may support several user roles e.g. all or any subset of the following roles:

System Administrator—this role enable to manage the system. It enables to create modify and delete accounts of all types and to reset passwords ("trusted authority")

Organization administrator—Organization administrators can create classes, assign them to teachers and access organizational statistics.

Teacher ("trusted user")

Parent (may be external recipient)

Staff member

Student ("child user")

Content Management User

Two separate levels of Login may be supported: Primary Login and Secondary Login; so as to define separate modes such as class mode and home mode.

---

Primary login typically uses a conventional username and password scheme. If the user identifies himself during primary login as a teacher then typically
{
    Secondary Login happens, e.g. some or all of:
    The system shows the list of students and requests a secondary identification.
    The identification includes selecting the student name from the list that is shown (the class list + teacher + staff)
    and then the appropriate login is shown and the password as entered is checked.
    IF correct password has been clicked

```
{
    The system marks to itself that it is in "Class Mode" and marks the student
that is now working.
        (by means of StudentID and signed cookie –
        so from here on each access to the server has two approved Identities:
            Teacher + Student to show that system is in class mode and
            give the class identity (classes are typically identified by
            teacher since teacher is unique to class) and the identity of the
            student that is now working).
        The user is transferred to an initial page for the child-user e.g. an
application selection page - ("What would you like to do now").
    }
}
Else if the user identify himself during the primary login as a student then
{
    The system marks to itself that it is in "Home Mode" and Marks the student that is
now working.
    The user is transferred to an initial page for the child-user e.g. the application
selection page - (What would you like to do now).
    At this stage when in home mode, the parent/adult carer can login using a PIN-
based a secondary login process; analogously, a teacher can typically log in, identifying
himself or herself using her or his PIN, when the child is at kindergarten, working in class
mode.
}
```

Typically, when a user logs in (primary login) to the system (SSL is enforced—so as not to pass credentials in the clear) the user credentials (username and password) are checked (password may be stored securely e.g. using a one way encryption algorithm (to disable the ability of retrieving user passwords). If the credentials are matched, the server typically creates a "login cookie". The cookie typically includes user id cookie expiration time which is typically encrypted and signed. The signature is typically added to the cookie. The cookie is typically returned as part of the response to the login request, typically together with a success indication whereas in case of failure, there is typically no indication of whether the username and/or password were incorrect.

From that point, each request that the client sends to the server typically includes the "login cookie". The server validates the signature, and, if correct, typically entitles the user that is assigned to it to grant the right permissions to that user (for example access to personal data—private address book, class resources etc.).

Teacher credentials typically enable teachers, once they have authenticated themselves e.g. by entering a PIN, e.g. to a work-session of a child end-user associated with that teacher, to perform teacher's functions which may include some or all of:

a. Manage the class definitions (for example manage the student list, define for each student his responsible adult email address, send student user names and passwords to the responsible adults) and/or b. Use the tools with the teacher's identity (for example read the email sent to the teacher and reply to the students, define new charts and polls using how much/how many).

c. Student's functions: students may use the system in "class mode" as opposed to using the system in "home mode" (from home). Typically these modes are not child-user selectable; instead different login levels are typically required.

When students use the system from home, they log in with their credentials which grant them a role of student. This allows them to use the tools from home. Not all activities that are defined for usage in class are necessarily open for usage at home, and not all home activities are necessarily open in the class. For example, the system might be configured such that private address book is managed only from home mode, or teachers can decide to use some of their polls only in "class mode".

Typically, when students use the system at class, they need to identify themselves. The system typically displays a list of all students, typically also of the teacher and the staff. Each name (student/teacher/staff) can be accompanied by a symbol or a picture.

The invention herein is not limited to any particular role (type of end user e.g.) or set of roles. For example, end-users may be deemed by the system to play any or all of the following roles:

The teacher and/or trusted authority, only, can activate a process that automatically creates users and assigns usernames and passwords to each child (and, optionally, staff member) in the class address book. This process creates a user per student such that each student has his own identity—giving her or him exclusive access to his mail, his private storage, his address book ("ab"), his class resources and to the system. Once the process has been activated, students can login from home and use the system.

Teachers: typically, have ability to send email to children and to the responsible adults of a child individually or to all responsible adults of a class. They typically do not have access to the private address books (student's family members or friends) of children in their class—do not maintain or see same and cannot send email thereto. Typically, teacher can access ChildUI but cannot access UI of the child's parent e.g. parent has her or his own PIN provided to the parent by an automatic process transparent to the teacher.

child: can send and receive emails only from people that are in the address book/s defined for him. Thus can send email only to their responsible adults & family members, and to those in the class address book parents: have access only to their own child's private address book which they maintain. Parents can access child UI.

The teacher may use a single icon to mark each child's allocated portion of shared physical resources in the school building. For example, an elephant might be used to mark each of the resources allocated to Josiah, such as "his" chair, cubby, coat-hook, towel-hook and workbook. A pitchfork might be used to mark the same for Sarah. According to certain embodiments, the same icons may be used to identify Josiah, Sara and other children respectively within the networking functionality—Josiah is identified by the elephant which all children in the class already associate with him, Sara by the pitchfork which all children in the class already associate with her, and so forth.

A particular advantage of certain embodiments is that children can be taught safety rules and ethical rules within a safe environment such that beginner violations of these rules do not have the serious consequences that the same violations have when children learn the same rules using a non-protected computerized social network. For example, conventionally, a child who violates safety rules using conventional social networks such as Facebook or email, or conventional networked information systems such as unfiltered Internet, may run the risk of coming into contact with a pedophile or with pornographic content respectively. In contrast, a child using a system provided in accordance with certain embodiments does not run these risks because the child's access to others via the social network is restricted only to those defined for her or him by trusted adults. While in this safe environment, the child learns how to protect himself, and not endanger or inconvenience others, safely.

According to an embodiment of the invention, a trusted authority such as a governmental ministry of education or local board of education pre-defines each teacher within a population of teachers, for the system. Each teacher-user so defined is given access to a teacher user interface which is operative to allow only teacher-users to each define a protected class environment within which the teacher-user pre-defines a child-user for each of her pupils. Typically, the teacher UI allows each teacher to enter, for each pupil, the pupil's name and to select an icon to represent that pupil such as a rose, sailboat, motorcycle or spoon. The teacher user also defines, per pupil, at least one trusted adult entity responsible for that pupil, including the adult entity's contact information (e.g. email address) and an alias identifying the adult entity for the child, such as "daddy and mommy" or "daddy" or "mommy" or "Aunt Sarah" e.g. if Aunt Sarah is known by the teacher to be the child's guardian. Typically, the teacher might identify two adult entities having "daddy" and "mommy" aliases respectively if the child's parents are divorced, but might identify only one adult entity, alias "mommy and daddy", for a child whose parents both live with her or him. Any suitable rules may be pre-defined to determine whether both parents in a divorced couple, or either one, suffice in order to authorize a child to communicate with a child in another class or with his dad's brother, Uncle Jonah.

It is appreciated that in the illustrated embodiment, the default internal recipient whitelist for each child is the children in his class. However, alternatively, the default whitelist might be empty and each parent (or pair of parents) needs to whitelist communication between children a and b even in the same class. According to some embodiments, a blacklist option is provided, whereby parents can remove default or previously authorized internal recipients from their child's current whitelist. Typically but not necessarily, when the child enters email mode, he is shown (a pictorial representation of) all recipients, or all internal recipients, in his current whitelist.

According to certain embodiments, a child's parent is unable to use a session opened by a child, or to use her or his child's credentials, which may be known to him to open such a session, so as to send emails to a child's friends. For example, access to the child's whitelist (address book) might be blocked, using any suitable known technology, if the child logs in from home rather than from the classroom, since no parents are present in the classroom.

It is appreciated that any and all of the data repositories herein e.g. those storing credentials and personal particulars of a child and other users, may be stored centrally and/or locally, and the data structure may be designed inter alia to take into account whichsoever privacy considerations may govern in any particular use-case.

PINs for each teacher-user may be assigned in an initialization stage, by a trusted authority.

According to certain embodiments, an initial login screen is provided which is uniform for all roles/types of users (internal recipients e.g.) including some or all of: teachers, children, other workers. The initial login screen may or may not also serve external recipients such as parents or other family members who are not members of any class. The initial login screen may prompt each user to provide her or his username and password. Typically, the system stores, in computer memory, an indication of user roles; if a user is a child, the system (e.g. upon receipt of the child's username) shows the child the picture or image stored, and prompts the child to enter "his" locations within that image. If the user is an adult, the system may simply await receipt of the user's username and password (PIN), as is conventional. Typically, each role has its own mode or environment; so once a user has logged in successfully, the system then displays a screen that suits that user's role such as a teacher's screen or a "what do you want to do?" screen for a child, or a "modify your child's whitelist" screen for a parent.

It is appreciated that spam emails typically cannot reach a child called Jane, other than spam emails generated by children on Jane's whitelist, since communication between internal recipients typically takes place via the dedicated server of the system shown and described herein rather than via SMTP (or any other external communication protocol such as but not limited to conventional protocols used for or by Whats-app, Facebook or SMS or variations thereupon).

It is appreciated that certain embodiments are described herein as email embodiments, however this is merely for simplicity. More generally, the system shown and described herein comprises a child-safe communication architecture/environment/network which limits each child's ability to communicate only to pre-approved recipients according to a predefined scheme (e.g. as described herein) of how recipients are pre-approved and by whom (parent/system/teacher). As described, some recipients may be semi-approved i.e. may communicate with the child only under certain limitations, such as but not limited to, teacher approval before the communication actually reaches the child. However, the communication network may be cocooned within a larger legacy general communication network e.g. the child may "send a communication to" an external recipient who is not part of the child-safe network e.g. by selecting the external recipient from the child's whitelist, and interfacing with the user interface provided by the child-safe communication environment; responsively, the server of the child-safe communication environment sends e.g. emails (or Whats-app, Facebook or SMS or variations thereupon) of the child's communication to the external recipients, and provides support for sending a response from the external recipient to the child e.g. by adding to the email a link leading to a web-page within a website associated with the child-safe communication environment; via this web-page the external recipient may communicate with the child; but the child's experience is of receiving an email (say) from the external recipient; typically the environment displays to the child an inbox including all communications sent to the child, whether internally or by external recipients, and, similarly, from the child's standpoint the environment (system) typically displays a single address book/whitelist including both internal and external recipients; however the difference therebetween is transparent to the child.

It is appreciated that according to certain embodiments, a child's address book may be used for any or all of: emails; other one-to-one messaging, forums, chatrooms; facebook-type communication and so forth.

The applicability of the system/environment shown and described herein need not be limited to email, Whats-app, Facebook or SMS or variations thereupon, and may more generally be employed for any sort of electronic or digital communication between end-users e.g. at any layer of the network.

It is appreciated that terminology such as "mandatory", "required", "need" and "must" refer to implementation choices made within the context of a particular implementation or application described herewithin for clarity and are not intended to be limiting since in an alternative implantation, the same elements might be defined as not mandatory and not required or might even be eliminated altogether.

It is appreciated that software components of the present invention including programs and data may, if desired, be implemented in ROM (read only memory) form including CD-ROMs, EPROMs and EEPROMs, or may be stored in any other suitable typically non-transitory computer-readable medium such as but not limited to disks of various kinds, cards of various kinds and RAMs. Components described herein as software may, alternatively, be implemented wholly or partly in hardware and/or firmware, if desired, using conventional techniques, and vice-versa. Each module or component may be centralized in a single location or distributed over several locations.

Included in the scope of the present disclosure, inter alia, are electromagnetic signals in accordance with the description herein. These may carry computer-readable instructions for performing any or all of the operations of any of the methods shown and described herein, in any suitable order including simultaneous performance of suitable groups of operations as appropriate; machine-readable instructions for performing any or all of the operations of any of the methods shown and described herein, in any suitable order; program storage devices readable by machine, tangibly embodying a program of instructions executable by the machine to perform any or all of the operations of any of the methods shown and described herein, in any suitable order; a computer program product comprising a computer useable medium having computer readable program code, such as executable code, having embodied therein, and/or including computer readable program code for performing, any or all of the operations of any of the methods shown and described herein, in any suitable order; any technical effects brought about by any or all of the operations of any of the methods shown and described herein, when performed in any suitable order; any suitable apparatus or device or combination of such, programmed to perform, alone or in combination, any or all of the operations of any of the methods shown and described herein, in any suitable order; electronic devices each including at least one processor and/or cooperating input device and/or output device and operative to perform e.g. in software any operations shown and described herein; information storage devices or physical records, such as disks or hard drives, causing at least one computer or other device to be configured so as to carry out any or all of the operations of any of the methods shown and described herein, in any suitable order; at least one program pre-stored e.g. in memory or on an information network such as the Internet, before or after being downloaded, which embodies any or all of the operations of any of the methods shown and described herein, in any suitable order, and the method of uploading or downloading such, and a system including server/s and/or client/s for using such; at least one processor configured to perform any combination of the described operations or to execute any combination of the described modules; and hardware which performs any or all of the operations of any of the methods shown and described herein, in any suitable order, either alone or in conjunction with software. Any computer-readable or machine-readable media described herein is intended to include non-transitory computer- or machine-readable media.

Any computations or other forms of analysis described herein may be performed by a suitable computerized method. Any operation or functionality described herein may be wholly or partially computer-implemented e.g. by one or more processors. The invention shown and described herein may include (a) using a computerized method to identify a solution to any of the problems or for any of the objectives described herein, the solution optionally includes at least one of a decision, an action, a product, a service or any other information described herein that impacts, in a positive manner, a problem or objectives described herein; and (b) outputting the solution.

The system may, if desired, be implemented as a web-based system employing software, computers, routers and telecommunications equipment as appropriate.

Any suitable deployment may be employed to provide functionalities e.g. software functionalities shown and described herein. For example, a server may store certain applications, for download to clients, which are executed at the client side, the server side serving only as a storehouse. Some or all functionalities e.g. software functionalities shown and described herein may be deployed in a cloud environment. Clients e.g. mobile communication devices such as smartphones may be operatively associated with, but external to, the cloud.

The scope of the present invention is not limited to structures and functions specifically described herein and is also intended to include devices which have the capacity to yield a structure, or perform a function, described herein, such that even though users of the device may not use the capacity, they are, if they so desire, able to modify the device to obtain the structure or function.

Features of the present invention, including operations, which are described in the context of separate embodiments, may also be provided in combination in a single embodiment. For example, a system embodiment is intended to include a corresponding process embodiment and vice versa. Also, each system embodiment is intended to include a server-centered "view" or client centered "view", or "view" from any other node of the system, of the entire functionality of the system, computer-readable medium, apparatus, including only those functionalities performed at that server or client or node. Features may also be combined with features known in the art and particularly, although not limited to, those described in the Background section or in publications mentioned therein.

Conversely, features of the invention, including operations, which are described for brevity in the context of a single embodiment or in a certain order may be provided separately or in any suitable subcombination, including with features known in the art (particularly although not limited to those described in the Background section or in publications mentioned therein) or in a different order. "e.g." is used herein in the sense of a specific example which is not intended to be limiting. Each method may comprise some or all of the operations illustrated or described, suitably ordered e.g. as illustrated or described herein.

Devices, apparatus or systems shown coupled in any of the drawings may in fact be integrated into a single platform in certain embodiments or may be coupled via any appropriate wired or wireless coupling such as but not limited to optical fiber, Ethernet, Wireless LAN, HomePNA, power line communication, cell phone, PDA, Blackberry GPRS, Satellite including GPS, or other mobile delivery. It is appreciated that in the description and drawings shown and described herein, functionalities described or illustrated as systems and sub-units thereof can also be provided as methods and operations therewithin, and functionalities described or illustrated as methods and operations therewithin can also be provided as systems and sub-units thereof. The scale used to illustrate various elements in the drawings is merely exemplary and/or appropriate for clarity of presentation and is not intended to be limiting.

The invention claimed is:

1. A secured computerized social networking system for pupil end-users including:
   a mail server including a processor, operative to:
   a. communicate with external recipients via a gateway to at least one external communication network serving the external recipients; and
   b. communicate with at least one internal recipient including the pupil end-users, thereby to define an internal secured network;
   computer memory/storage accessible by the mail server and operative to store:
   associations between individual parents who are nodes in the at least one external communication network and individual internal recipients from among the pupil end-users thereby to define at least one parent end-user of the individual parents for each of the pupil end-users; and
   white-lists of authorized communicants for individual pupil end-users of the pupil end-users, provided by the mail server;
   wherein the mail server is operative to interface with:
   a secured parent environment including a parent's user-interface, operative, responsive to control by a processor, to allow each of said individual parents whose association with a given pupil from among the pupil end-users is stored in said memory, to authenticate himself and subsequently to define for the mail server, a white-list of the pupil end-users with whom said given pupil's parent authorizes his child (said given pupil) to communicate; and
   a secured pupil environment including a pupil's user-interface, operative, responsive to control by a processor, to allow the given pupil to communicate via said mail server with any of the pupil end-users appearing on the whitelist of internal recipients stored in the memory for the given pupil;
   wherein for at least one first and at least one second pupil end-user from among the pupil end-users, the mail server's logic is configured such that the whitelist provided to the memory for the first pupil end-user includes the second pupil end-user, if and only if, the first and second pupil end users' parents of the individual parents, as defined by said associations, have each, via their respective parent's user-interface, authorized communication between the first and second pupil end users, thereby to define the first and second pupil end users as an authorized pair of communicants, and wherein the system includes a pupil database storing a pupil data record for each of the pupil end-users in a supported pupil population and wherein each pupil data record is operative for storing an association between each of the pupil end-users and an individual class and wherein the default internal recipient white-list for each of the pupil end-users is the pupil end-users in her/his individual class,
   the system comprising:
   a what-you-know authentication test-protected secured environment; and
   a security server with a what-you-know authentication test-based access control subsystem protecting access to the secured environment, providing access only to users who have interacted with what-you-know testing functionality and passed a what-you-know authentication test comprising entry of a picture-based password memorable to and producible by a pre-literate or semi-literate child,
   wherein network security is not solely based on the picture-based password and instead at least one additional layer of security is provided, thereby to provide picture-password based access control, cocooned within at least one additional layer of security,
   the system being operative to perform a plurality of selectable system-actions responsive to user input, the system being accessible to non-literate users via a touch screen defining a plurality of touch screen locations respectively corresponding to the plurality of selectable system-actions, the touch screen being operative to detect and distinguish between first and second gestures, the system comprising:
   a processor-controlled touch-triggered actor which, responsive to at least each first gesture applied by an end-user to an individual location within the touch screen, from among a plurality of touch screen locations, performs at least one individual action, from among said plurality of actions, which corresponds to said individual location; and
   a processor-controlled touch-triggered oral presenter which, responsive to at least each second gesture applied by an end-user to an individual location within the touch screen, from among the plurality of touch screen locations, presents an oral characterization of the at least one individual action, from among said plurality of actions, which corresponds to said individual location.

2. A system according to claim 1 and also comprising an oral presentation library including a plurality of recorded oral presentations in a computer-implemented memory which, when played to the end user by the oral presenter, orally characterize the plurality of actions respectively.

3. A system according to claim 1 wherein the oral presenter also presents an oral characterization of the individual action, from among said plurality of actions, which corresponds to said individual location, responsive to each first gesture applied by an end-user to the individual location within the touch screen.

4. A system according to claim 2 and also comprising a rules database storing, in a computer-implemented memory, at least one rule governing the behavior of at least one of the oral presenter and the actor, responsive to at least one sequence of end-user gestures including initial and subsequent end-user gestures.

5. A system according to claim 4 wherein the rules database stores at least one premature-gesture-handling rule governing the oral presenter's behavior responsive to situations in which an end-user triggers a recorded oral presentation of an individual action A by applying a gesture to an individual location AA corresponding to action A and subsequently, "prematurely" i.e. before the recorded oral presentation of individual action A has finished playing, the end-user applies a gesture to an individual location BB corresponding to action B.

6. A system according to claim 5 wherein least one premature-gesture-handling rule is operative for instructing the oral presenter to abort playing of a recorded oral presentation of at least one individual action A and to begin playing, instead, the recorded oral presentation of individual action B, if the end-user has applied an initial gesture, triggering playing of a recorded oral presentation of an action A, to an individual location AA corresponding to action A and subsequently, before the recorded oral presentation of individual action A has finished playing, the end-user applied a subsequent gesture, triggering playing of a recorded oral presentation of action B, to an individual location BB corresponding to action B.

7. A system according to claim 4 wherein the rules database stores at least one immediately-subsequent-gesture-handling rule governing the behavior, of at least one of the oral presenter and the actor, responsive to situations in which an end-user applies a subsequent gesture "immediately" after i.e. within a predetermined time window after an initial gesture.

8. A system according to claim 4 and wherein said actions are each assigned one of at least 2 levels of priority and wherein the rules database stores rules governing behavior of at least one of the oral presenter and the actor responsive to at least one sequence of end-user gestures including initial and subsequent end-user gestures and wherein one of the rules is selected for application depending at least partly on a level of priority of the action corresponding to the initial end-user gesture.

9. A system according to claim 1 wherein said first gesture comprises a brief tap.

10. A system according to claim 1 wherein said second gesture comprises a tap-hold.

11. A system according to claim 1 and also comprising a touch screen operative to detect, and distinguish between, the first and second gestures.

12. A system according to claim 1 and also comprising a tablet having a touch screen operative to detect, and distinguish between, the first and second gestures.

13. A system according to claim 8 wherein said levels of priority determine whether or not an action of at least one of the oral presenter and the actor, initiated responsive to the initial end-user gesture, is interruptible if the action interferes with another action which is to be initiated responsive to the subsequent end-user gesture.

14. A system according to claim 1 wherein the mail server and gateway allow outgoing communication with external network/s and the gateway comprises a one-way gateway which does not allow incoming communication, thereby to generate an internal network secured from incoming communication from external networks;
and wherein an identity manager is associated with the email server and is operative to control access of users depending on their roles as stored in computer memory, and subject to their providing authentication;
and wherein the system is pre-configured such that no communication is possible other than communication between authorized pairs of communicants and wherein rules defining authorized pairs of communicants includes that pupils of a single teacher can all communicate with one another.

15. A secured computerized social networking method serving pupil end-users and including:
providing a mail server including a processor, operative to:
  a. communicate with external recipients via a gateway to at least one external communication network serving the external recipients; and
  b. communicate with at least one internal recipient including the pupil end-users, thereby to define an internal secured network;
using computer memory/storage to store:
  associations between individual parents who are nodes in the at least one external communication network and individual internal recipients from among the pupil end-users; and
  white-lists of authorized communicants for individual pupil end-users of the pupil end-users, provided by the mail server;
wherein the mail server is operative to interface with:
  a secured parent environment including a parent's user-interface, operative, responsive to control by a processor, to allow each of said individual parents whose association with a given pupil from among the pupil end-users is stored in said memory, to authenticate himself and subsequently to define for the mail server, a white-list of the pupil end-users with whom said given pupil's parent authorizes his child (said given pupil) to communicate; and
  a secured pupil environment including a pupil's user-interface, operative, responsive to control by a processor, to allow the given pupil to communicate via said mail server with any of the pupil end-users appearing on the whitelist of internal recipients stored in the memory for the given pupil;
wherein for at least one first and at least one second pupil end-user from among the pupil end-users, the mail server's logic is configured such that the whitelist provided to the memory for the first pupil end-user includes the second pupil end-user, if and only if, the first and second pupil end users' parents, as defined by said associations, have each, via their respective parent's user-interface, authorized communication between the first and second pupil end users, thereby to define the first and second pupil end users as an authorized pair of communicants, and wherein the system includes a pupil database storing a pupil data record for each of the pupil end-users in a supported pupil population and wherein each pupil data record is operative for storing an association between each of the pupil end-users and an individual class and wherein the default internal recipient white-list for each of the pupil end-users is the pupil end-users in her/his individual class,
the method comprising:
  providing a what-you-know authentication test-protected secured environment; and
  providing a security server with a what-you-know authentication test-based access control subsystem protecting access to the secured environment, providing access only to users who have interacted with what-you-know testing functionality and passed a what-you-know authentication test comprising entry of a picture-based password memorable to and producible by a pre-literate or semi-literate child,
wherein network security is not solely based on the picture-based password and instead at least one additional layer of security is provided, thereby to provide picture-password based access control, cocooned within at least one additional layer of security,
the method being operative to perform a plurality of selectable system-actions responsive to user input, the method interfacing with non-literate users via a touch screen defining a plurality of touch screen locations respectively corresponding to the plurality of selectable system-actions, the touch screen being operative to detect and distinguish between first and second gestures, the method comprising: responsive to at least each first gesture applied by an end-user to an individual location within the touch screen, from among a plurality of touch screen locations, performing at least one individual action, from among said plurality of actions, which corresponds to said individual location; and
    responsive to at least each second gesture applied by an end-user to an individual location within the touch screen, from among the plurality of touch screen locations, presenting an oral characterization of the at least one individual action, from among said plurality of actions, which corresponds to said individual location.

16. A computer program product, comprising a non-transitory tangible computer readable medium having computer readable program code embodied therein, said computer readable program code adapted to be executed to implement a secured computerized social networking method serving pupil end-users and including:
    providing a mail server including a processor, operative to:
        a. communicate with external recipients via a gateway to at least one external communication network serving the external recipients; and
        b. communicate with at least one internal recipient including pupil end-users, thereby to define an internal secured network;
    using computer memory/storage to store:
        associations between individual parents who are nodes in the at least one external communication network and individual internal recipients from among the pupil end-users; and
        white-lists of authorized communicants for individual pupil end-users of the pupil end-users, provided by the mail server;
    wherein the mail server is operative to interface with:
        a secured parent environment including a parent's user-interface, operative, responsive to control by a processor, to allow each of said individual parents whose association with a given pupil from among the pupil end-users is stored in said memory, to authenticate himself and subsequently to define for the mail server, a white-list of the pupil end-users with whom said given pupil's parent authorizes his child (said given pupil) to communicate; and
        a secured pupil environment including a pupil's user-interface, operative, responsive to control by a processor, to allow the given pupil to communicate via said mail server with any of the pupil end-users appearing on the whitelist of internal recipients stored in the memory for the given pupil;
    wherein for at least one first and at least one second pupil end-user from among the pupil end-users, the mail server's logic is configured such that the whitelist provided to the memory for the first pupil end-user includes the second pupil end-user, if and only if, the first and second pupil end-users' parents, as defined by said associations, have each, via their respective parent's user-interface, authorized communication between the first and second pupil end-users, thereby to define the first and second pupil end-users as an authorized pair of communicants, and wherein the system includes a pupil database storing a pupil data record for each of the pupil end-users in a supported pupil population and wherein each pupil data record is operative for storing an association between each of the pupil end-users and an individual class and wherein the default internal recipient white-list for each of the pupil end-users is the pupil end-users in her/his individual class, the method comprising:
    providing a what-you-know authentication test-protected secured environment; and
    providing a security server with a what-you-know authentication test-based access control subsystem protecting access to the secured environment, providing access only to users who have interacted with what-you-know testing functionality and passed a what-you-know authentication test comprising entry of a picture-based password memorable to and producible by a pre-literate or semi-literate child,
wherein network security is not solely based on the picture-based password and instead at least one additional layer of security is provided, thereby to provide picture-password based access control, cocooned within at least one additional layer of security,
    the method being operative to perform a plurality of selectable system-actions responsive to user input, the method interfacing with non-literate users via a touch screen defining a plurality of touch screen locations respectively corresponding to the plurality of selectable system-actions, the touch screen being operative to detect and distinguish between first and second gestures, the method comprising:
responsive to at least each first gesture applied by an end-user to an individual location within the touch screen, from among a plurality of touch screen locations, performing at least one individual action, from among said plurality of actions, which corresponds to said individual location; and
    responsive to at least each second gesture applied by an end-user to an individual location within the touch screen, from among the plurality of touch screen locations, presenting an oral characterization of the at least one individual action, from among said plurality of actions, which corresponds to said individual location.

* * * * *